(12) United States Patent
Battaglia et al.

(10) Patent No.: US 10,262,263 B2
(45) Date of Patent: Apr. 16, 2019

(54) RETRIEVING DATABASE SCORE CONTEXTUAL INFORMATION

(71) Applicant: International Business Machines Corporation, Armonk, NY (US)

(72) Inventors: Michael Battaglia, Lagrangeville, NY (US); Heather A. Smith, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 14/967,000

(22) Filed: Dec. 11, 2015

(65) Prior Publication Data

US 2017/0169021 A1    Jun. 15, 2017

(51) Int. Cl.
*G06F 17/00* (2006.01)
*G06N 5/02* (2006.01)
*G06F 17/30* (2006.01)

(52) U.S. Cl.
CPC ......... *G06N 5/02* (2013.01); *G06F 17/30292* (2013.01)

(58) Field of Classification Search
CPC ......... G06F 17/30289; G06F 17/30312; G06F 17/30542; G06F 21/6227; G06F 17/30306
See application file for complete search history.

(56) References Cited

U.S. PATENT DOCUMENTS

| | | | |
|---|---|---|---|
| 8,001,158 B2 | 8/2011 | Hambrick et al. | |
| 8,195,697 B2 | 6/2012 | Maeda et al. | |
| 8,880,505 B2 | 11/2014 | Shmueli et al. | |
| 2011/0213799 A1 | 9/2011 | Benson | |
| 2014/0229491 A1* | 8/2014 | Bhattacharjee | ... G06F 17/30569 707/748 |
| 2015/0121453 A1 | 4/2015 | Gupta | |

OTHER PUBLICATIONS

Eessaar et al., "A Decision Support Method for Evaluating Database Designs", CEUR Workshop Proceedings, vol. 593, Dec. 2008.
Lemaitre, "Evaluation an Improvement of Database Schemas: A transformation-based framework", The 22nd International Conference on Advanced Information Systems Engineering (CAiSE'10), Jun. 7-11, 2010, Hammamet, Tunisia.

\* cited by examiner

*Primary Examiner* — Truong V Vo
(74) *Attorney, Agent, or Firm* — Scully, Scott, Murphy & Presser, P.C.; Kurt Goudy, Esq.

(57) ABSTRACT

A system, method and computer program product for evaluating a user's database (db) design schema and definitions syntax and generating a database score according to applied decision tree logic. The database design syntax is automatically evaluated and decision tree logic is applied to determine a context of the database design object and associated syntax and definitions statements. As a result of the automated evaluation, users may then obtain, via a user interface device, a detailed context information associated with their design to assist them in understanding how their database score was derived. By using this detailed contextual information, users analyze the results and can understand what changes can be made to improve their definitions Database Score. The system and method increases the ability of the user to create better database definitions by learning and improving using the contextual data returned.

17 Claims, 23 Drawing Sheets

PERSON DATA — 301

| PERSON ID | FNAME | LNAME | MI | EMAIL | PHOTO | HOBBIES | MONTHLY_PAY | LANGUAGES |
|---|---|---|---|---|---|---|---|---|
| 100 | Bob | Jones | A | bob@abc.com | bin image | skiing bike riding | 3100.75 | English |
| 200 | Jane | Sinclair |  | js@abc.com |  |  | 4000.25 | English, French |
| 300 | Alex | Smith | J | as@abc.com | bin image | horse back riding | 3500.88 | English |

ADDRESS DATA — 302

| PERSON ID | ADDR01_L1 | ADDR01_L2 | ADDR01_L3 | ADDR02_L1 | ADDR02_L2 | ADDR02_L3 | ADDR03_L1 | ADDR03_L2 | ADDR03_L3 | COUNTRY_CODE |
|---|---|---|---|---|---|---|---|---|---|---|
| 100 | 235 Main St |  | Boston, MA |  |  |  |  |  |  | USA |
| 200 | 16 Deal Ave | Apt 210 | Austin, TX | 22 Lake St | Kal, MI |  |  |  |  | USA |
| 300 | 110 First Ave |  | Bronx, NY |  |  |  |  |  |  | USA |

COUNTRY DATA — 303

| COUNTRY CODE | COUNTRY_NAME | TIMEZONE | COORDINATES |
|---|---|---|---|
| USA | United State of America | E,C,M,P |  |
| MX | Mexico |  |  |
| CA | Canada |  |  |

```
CREATE TABLE EMP.PERSON
(
PERSON_ID BIGINT NOT NULL WITH DEFAULT
,FNAME VARCHAR(100)
,LNAME VARCHAR(100)
,MI VARCHAR(1)
,EMAIL VARCHAR(256)
,PHOTO BLOB
,HOBBIES CLOB           ~411A
,MONTHLY_PAY DECIMAL(16,2)  ~412A
,LANGUAGES VARCHAR(100)
);

ALTER TABLE EMP.PERSON ADD CONSTRAINT
PK_PERSON PRIMARY KEY (PERSON_ID)
;
```
⎫
⎬ 401A
⎭

```
CREATE TABLE EMP.ADDRESS
(
PERSON_ID SMALLINT NOT NULL
,ADDR01_L1 VARCHAR(100)
,ADDR01_L2 VARCHAR(100)
,ADDR01_L3 VARCHAR(100)
,ADDR02_L1 VARCHAR(100)
,ADDR02_L2 VARCHAR(100)
,ADDR02_L3 VARCHAR(100)
,ADDR03_L1 VARCHAR(100)
,ADDR03_L2 VARCHAR(100)
,ADDR03_L3 VARCHAR(100)
,COUNTRY_CODE VARCHAR(03)
)
;
```
⎫ 402A

```
CREATE TABLE EMP.COUNTRY
(
COUNTRY_CODE VARCHAR(03) NOT NULL WITH
DEFAULT
,COUNTRY_NAME VARCHAR(100)
,TIMEZONE CHAR(10)
,COORDINATES CLOB    ~431A
)
;
```
⎫ 403A

```
CREATE TABLE EMP.PERSON
(
PERSON_ID BIGINT NOT NULL WITH DEFAULT
,FNAME VARCHAR(100)
,LNAME VARCHAR(100)
,MI VARCHAR(1)
,EMAIL VARCHAR(256)
,PHOTO BLOB
,HOBBIES LONG   ~411B
,MONTHLY_PAY NUMBER(16,2)  ~412B
,LANGUAGES VARCHAR(100)
);

ALTER TABLE EMP.PERSON ADD CONSTRAINT
PK_PERSON PRIMARY KEY (PERSON_ID)
;
```
⎫ 401B

```
CREATE TABLE EMP.ADDRESS
(
PERSON_ID TINYINT NOT NULL
,ADDR01_L1 VARCHAR(100)
,ADDR01_L2 VARCHAR(100)
,ADDR01_L3 VARCHAR(100)
,ADDR02_L1 VARCHAR(100)
,ADDR02_L2 VARCHAR(100)
,ADDR02_L3 VARCHAR(100)
,ADDR03_L1 VARCHAR(100)
,ADDR03_L2 VARCHAR(100)
,ADDR03_L3 VARCHAR(100)
,COUNTRY_CODE VARCHAR(03)
)
;
```
⎫ 402B

```
CREATE TABLE EMP.COUNTRY
(
COUNTRY_CODE VARCHAR(03) NOT NULL WITH
DEFAULT
,COUNTRY_NAME VARCHAR(100)
,TIMEZONE CHAR(10)
,COORDINATES LONG   ~431B
)
;
```
⎫ 403B

FIG. 4

| Database Object Self Help Report | 800 |
|---|---|

DATABASE SCORE 639 FOR A SIMPLE DESIGN — 802

801A
```
CREATE TABLE EMP.PERSON
(
PERSON_ID BIGINT NOT NULL WITH DEFAULT
Column PERSON_ID is a PRIMARY KEY DEFINED with NOT NULL WITH DEFAULT, PRIMARY KEYS
should be NOT NULL since a DEFAULT would allow only one value,low ⎯⎯ 862
,FNAME VARCHAR(100)
,LNAME VARCHAR(100)
,MI VARCHAR(1)
Column MI is VARCHAR but has a length of 1 byte, VARCHAR fields should be defined on
columns with large variations and account for any overhead loss,low ⎯⎯ 864
,EMAIL VARCHAR(256)
,PHOTO BLOB
,HOBBIES CLOB
,MONTHLY_PAY DECIMAL(16,2)
,LANGUAGES VARCHAR(100)
);
ALTER TABLE EMP.PERSON ADD CONSTRAINT PK_PERSON PRIMARY KEY (PERSON_ID)
;
The table EMP.PERSON has all columns defined as NULLable beyond the PRIMARY KEY,There
should be required fields,considerable
                                                                            ⎯ 868
```

802A
```
CREATE TABLE EMP.ADDRESS
(
PERSON_ID SMALLINT NOT NULL
Column PERSON_ID is a PRIMARY KEY in Table EMP.PERSON, Verify whether a FOREIGN KEY
should be added or possibly combining tables,moderate
Column PERSON_ID is defined in another table differently, IF the PRIMARY KEY definition
is correct the column should be BIGINT,low
,ADDR01_L1 VARCHAR(100)
,ADDR01_L2 VARCHAR(100)
,ADDR01_L3 VARCHAR(100)
,ADDR02_L1 VARCHAR(100)
,ADDR02_L2 VARCHAR(100)
,ADDR02_L3 VARCHAR(100)
,ADDR03_L1 VARCHAR(100)
,ADDR03_L2 VARCHAR(100)
,ADDR03_L3 VARCHAR(100)
,COUNTRY_CODE VARCHAR(03)
)
;
```

803A
```
CREATE TABLE EMP.COUNTRY
(
COUNTRY_CODE VARCHAR(03) NOT NULL WITH DEFAULT
,COUNTRY_NAME VARCHAR(100)
,TIMEZONE CHAR(10)
,COORDINATES CLOB
)
;
```

FIG. 8

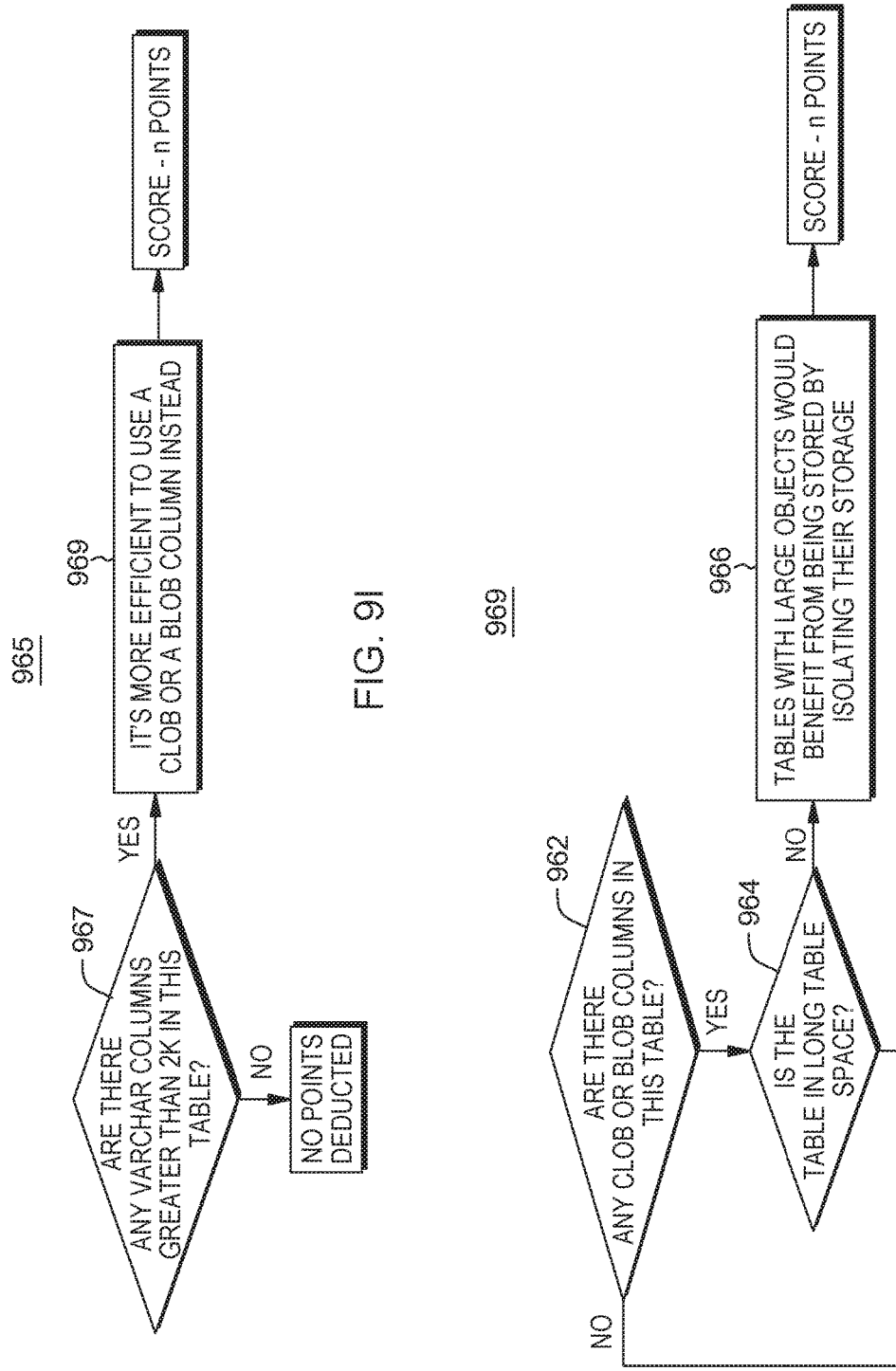

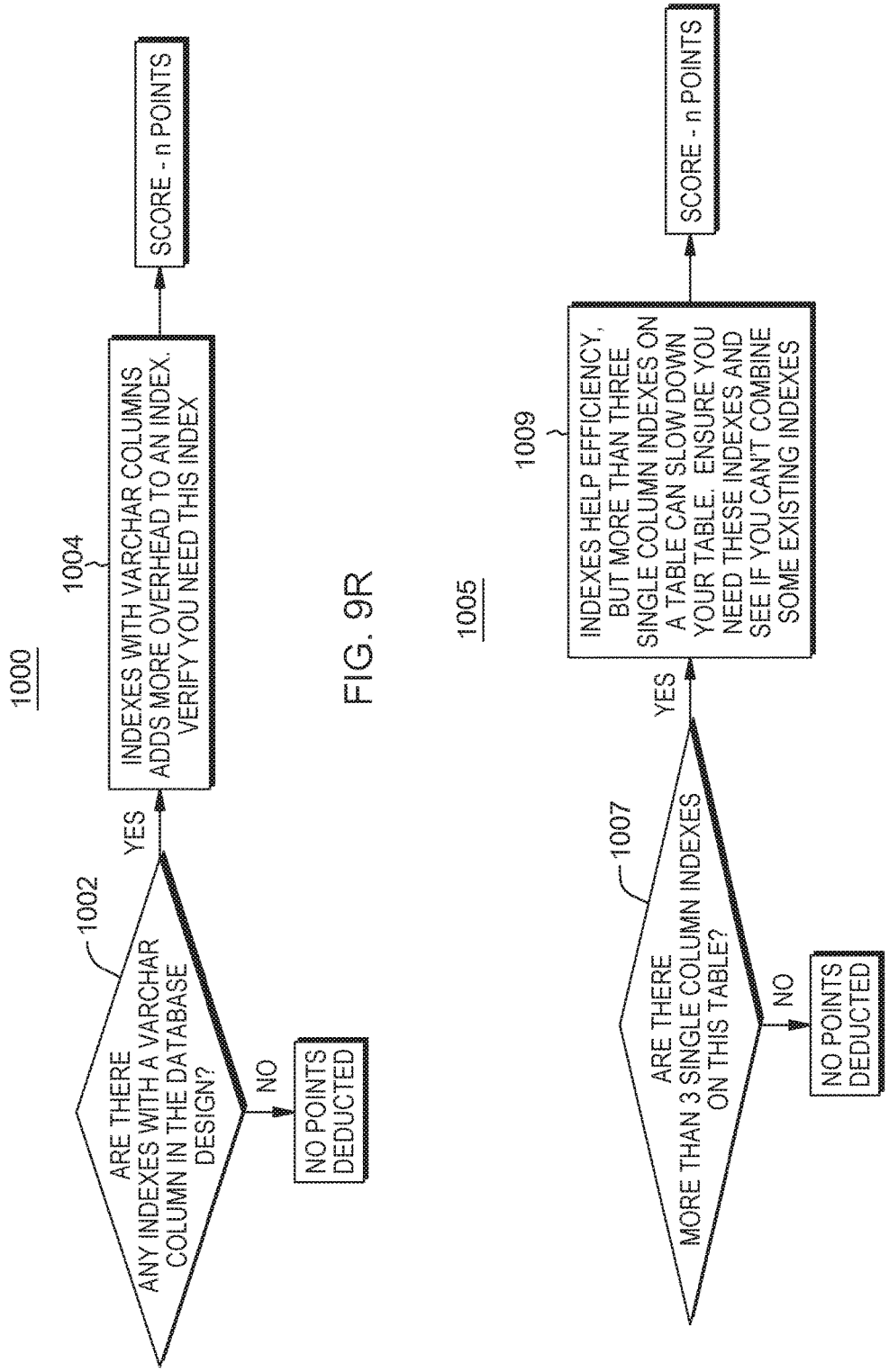

RETRIEVING DATABASE SCORE CONTEXTUAL INFORMATION

FIELD

The present disclosure relates generally to database design analytics, and more particularly to a system and method for automatically evaluating database designs by determining and obtaining detailed contextual information from a repository based on database design definitions, and automatically analyzing the results to allow a user to retrieve information to assist them in understanding how a Database Score was derived and understand what changes can be made to improve the definitions database score.

BACKGROUND

As known, in the field of database design, there are several design aspects that are considered. One design aspect is the collection of things, e.g., objects that are relevant to the database. For example, an object may comprise a database table. An attribute is a description or quantitative characteristic of a database object. An example of an attribute would be a database column and its characteristics like its datatype and whether or not is can be null. A primary key is an attribute (or combination of attributes) that uniquely identifies an instance of a table row. A primary key cannot be null and the value assigned to a primary key should not change over time. A logical link between two objects defines a relationship and may be used to represent a business rule. An example relationship between entities include: a "one-to-many" type in which one instance of the parent object relates to many instances of a child object. A "foreign key" exists when the primary key of a parent object exists in a child object. A foreign key requires that values must be present in the parent object before like values may be inserted in the child object.

Other objects may include things created in the database, e.g., tables, triggers, indexes, some of which may be subject to constraints.

While systems exist that only evaluates best practices the currently-available database systems provide no mechanism to actively understand, assess, and improve a database score.

SUMMARY

In accordance with a first aspect disclosed herein, there is set forth a system, method and computer program product for automatically generating a database score for a proposed database design and definitions syntax and return contextual help for a user.

The system and method receives database design information and implements a repository of decision trees, measurements, and implements rules for deducting points used in generating scores for each type of database object definition and design, and returns the object definition along with a scoring contextual data that would either have attributed to a higher or lower weighted score for the object. Each object in the definition will be returned back with contextual scoring information and definition information.

Additionally, there is generated guidance and help information on how to improve the database score based on the conditions the design was evaluated against.

In accordance with a first aspect of the disclosure, there is provided a method for evaluating a database design. The method comprises: receiving, at a computing system, a design syntax or statements associated with one or more objects of a database; evaluating, by a processing device of the computer system, the design syntax or statements of each of the one or more objects of the database; identifying, as a result of the evaluating, an issue associated with a design syntax or statement; and obtaining, a context information of any issue identified, the context information indicating a reason for identifying the associated issue; providing, via a user interface, a feedback of the database design to a user, the feedback indicating the obtained context of each issue identified, the feedback providing a guidance for a user to improve upon the database design.

In accordance with a further aspect of the disclosure, there is provided a system for evaluating a database design. The system comprises: a memory storage device; a processing unit associated with the memory storage device, the processing unit configured to: receive a design syntax or statements associated with one or more objects of a database; evaluate the design syntax or statements of each of the one or more objects of the database; identify, as a result of the evaluating, an issue associated with a design syntax or statement; obtain a context information of any issue identified, the context information indicating a reason for identifying the associated issue; and provide, via a user interface, a feedback of the database design to a user, the feedback indicating the obtained context of each issue identified, the feedback providing a guidance for a user to improve upon the database design.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

FIG. 3 show example database tables used for illustrating methods of database context scoring as applied by the automated methods of FIG. 1;

FIG. 4 show two examples of proposed database syntax designs for generating the tables of FIG. 3 used for illustrating the automated methods of FIG. 1;

FIG. 8 depicts an example user report generated by running the method of the present disclosure that indicates a user's scored syntaxes and corresponding contextual information;

FIG. 9I depicts another example of decision tree logic employed to perform an evaluation on varchar column types larger than 2 k; FIG. 9J depicts another example of decision tree logic employed to perform a check on clob or blob column types; FIG. 9R depicts another example of decision tree logic employed to perform an evaluation on indexes; FIG. 9S depicts another example of decision tree logic employed to perform another evaluation on indexes per table.

DETAILED DESCRIPTION

A system, method and computer program product is provided that evaluates a user's database (db) design schema and definitions syntax and generates a score ("database score") according to applied decision tree logic. The database design syntax is automatically evaluated and decision tree logic is applied to further determine a context of the database design object and associated definitions statements. The user may then obtain detailed context information associated with their design to assist them in understanding how their database score was derived.

By using this detailed contextual information, users can analyze the results and understand what changes can be made to improve their definitions Database Score. It increases the ability of the user to create better Database definitions by learning and improving using the contextual data returned.

In one embodiment, a user inputs to a computer system a database design syntax and receives as an output, e.g., via a data or display interface, a quantifying reason(s) that were used in creating a Database Score. The method is supplied the design information and uses a repository of decision trees, measurements, and scores for each type of database object definition and design and returns the object definition along with the scoring contextual data that would either have attributed to a higher or lower weighted score for the object. Each object in the definition is returned back with contextual scoring information and definition information. There is additionally provided guidance and help information on how to improve the database score based on the conditions it was evaluated against.

Figure 1:
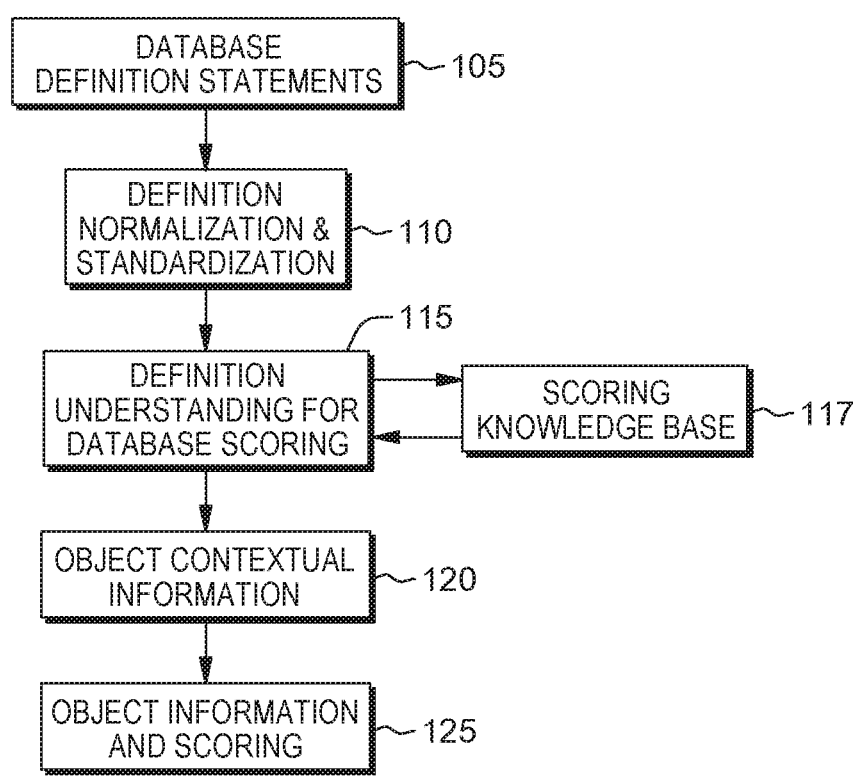
FIG. 1 is an exemplary top-level flowchart illustrating an embodiment of a database contextual scoring method, according to one embodiment.
Figure 2:
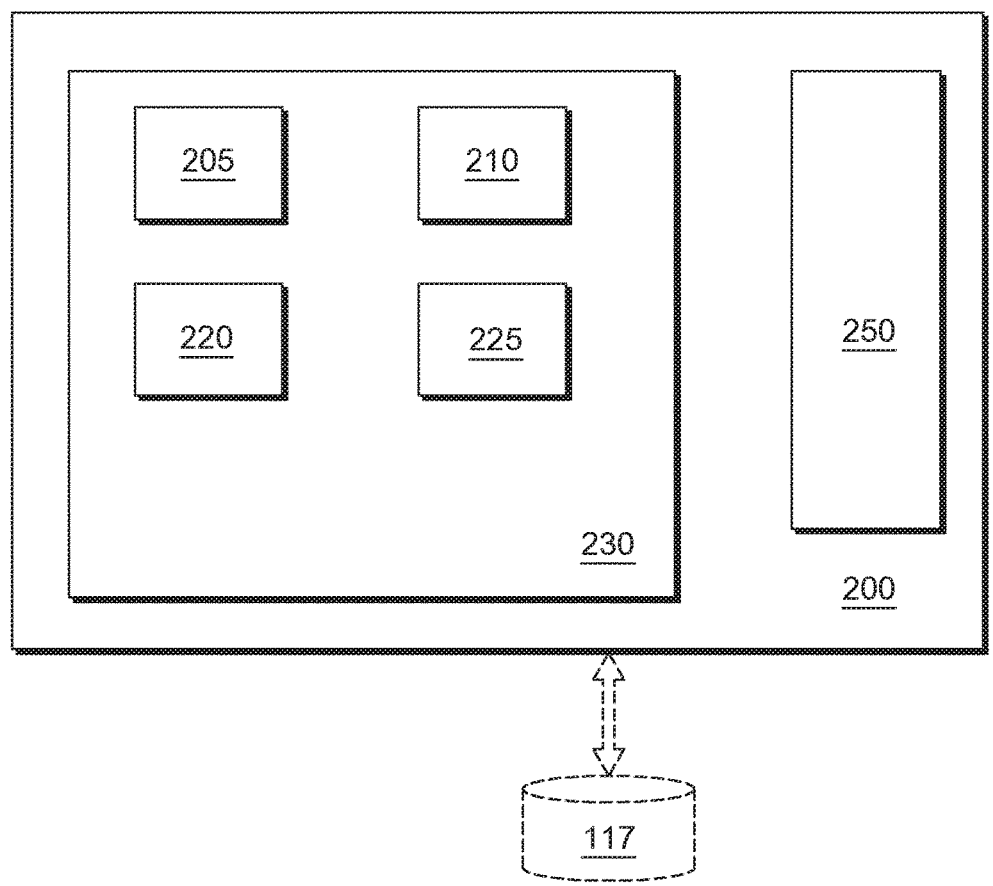
FIG. 2 is another exemplary schematic view of a software program portion of a computer system embodiment for running the automated methods of FIG. 1.

FIG. 1 shows a flow chart 100 depicting a computer-implemented method according to the present invention. FIG. 2 shows one embodiment of a system 200 including a processing device 250 that runs software program 230 stored in a tangible media, e.g., a memory storage device 230 for performing at least some of the method steps of flow chart 100. Further associated with system 200 is a further knowledgebase, e.g., a database storage device, that includes the detailed contextual content information and associated rules used for determining point values used in database scoring. The system 200 processing node may be encompassed by computing devices, e.g., desktop, laptops, services, mobile devices, that may accessible via networked and/or cloud communications infrastructure, e.g., via a LAN, WAN, wireless and/or wired public or private communications network, e.g., via internet or virtual private network. Thus, database evaluations may be conducted remotely via user devices via networked communications.

The method 100 and associated software 230 will now be discussed with extensive reference to FIG. 1 (for the method step blocks) and FIG. 2 (for the software blocks).

In the method 100 of FIG. 1, processing begins at step 105 where a receive database definition statements module ("mod") 205 receives DDL design definitions syntax of a proposed database architecture and/or database schema designed by a user. In this embodiment, the database definitions syntax (and other DDL statements) may be according to any well known or later developed data definitions or data description language, e.g., DDL, where statements include declarations and definitions used to build and modify the structure of tables and other objects in the database design. In one embodiment, for example, such database design code include DDL statements used to create, modify, and remove database objects such as tables, indexes, and keys, e.g., using DDL statements such as CREATE, ALTER, and DROP.

Alternatively, the received statements may include additional statements that define or modify database objects.

Processing proceeds to step 110 where a normalization operations module 210 performs normalization and standardization operations to ensure the input definitions syntax conform to syntax of all standard database system types. The conforming user's design definitions to standard db syntax enable easy recognition for the decision tree processing in the decision tree processing module, e.g., when determining database scores.

Processing proceeds to step 115 where database understanding and scoring module 215 runs a set of machine readable decision operations on the definition statements to understand the statements for scoring purposes. At step 115 the method includes accessing a scoring knowledgebase 117 that implements the decision tree logic to interpret the data definition statements and understand a context within which to score. The knowledge base repository of database contextual information and decision trees are used to obtain object design measurements used to return object scoring and related context. In one embodiment, the knowledge base 117 implements decision tree logic such as described with respect to FIGS. 9A-9U, embodied as rules implemented for deducting points from a database score based on the determined context, i.e., the reasons for the score.

Processing then proceeds to step 120 where object contextual module 220 receives interpreted definitions statements and understanding based on the decision tree logic processing performed at 115 and associates contextual information with database objects of the user's designed definitions and schema. This assigning of contextual information and generating of corresponding database scores to database objects is performed by machine logic (primarily software in this embodiment).

Finally, processing proceeds to step 125 where object information and scoring module 225 computes a database score of the user's proposed design definitions and schema based on the results obtained by contextual module 220 processing. In scoring module 225, a total amount of points to be deducted from the initial user database score is based on decision tree logic results and the understanding of the respective context within which to score. This step is performed for each of the database objects of the user's designed definitions and schema.

In a further embodiment, scoring module 225 will further generate a self-help report for the user that highlights where points were deducted for specific objects and explanations as to the context (reason) for the point deduction.

There is now provided an exemplary illustration of the method flow depicted in FIG. 1 for evaluating a user's database design and generating a report indicating the issues related to the design of objects created in the database design, e.g., a table or a trigger, and indicate ways of improvement. In the non-limiting illustrative example, a database design for illustrating method 100 is implemented to evaluate a database design that creates three database tables 301, 301, 303 shown in FIG. 3 including creating of indexes and constraints. Table 301 is an example relational database table for storing data corresponding to a user's personal information (a key being a user's "Person_ID"). Table 302 is an example relational database table for storing data corresponding to that user's address information keyed by the user's "Person_ID". Table 303 is an example relational database table for storing data corresponding to a user's country of residence information and keyed to user's address "country code". It is understood that the examples referred to herein relate to a relational database, however this system and method is not limited to relational databases.

In the non-limiting illustrative example, FIG. 4 shows example database definitions, e.g., in a DDL, for two users, for contrasting different database designs. Corresponding to relational database table 301 of FIG. 3, a first User A may propose a database data definition syntax 401A for creating the persona data Table 301. Corresponding to relational database table 301, a second User B may propose a database data definition syntax 401B for creating the person's data Table 301. In proposed definition syntax 401A, User A defines a variable "HOBBIES" as type CLOB (character large object) 411A, while User B defines a variable "HOBBIES" as type LONG 411B. Further, in proposed definition syntax 402A, User A defines a variable "MONTHLY PAY" as a DECIMAL type (Tuple) 412A, User B defines the variable "MONTHLY PAY" as a NUMBER type (Tuple) 412B.

Corresponding to relational database table 302 of FIG. 3, the first User A may propose a database data definition syntax 402A for creating the person's corresponding address data Table 302. Where User A defines PERSON_ID as SMALLINT and where User B defines PERSON_ID as TINYINT in proposed a database data definition syntax 402B.

Corresponding to relational database table 303 of FIG. 3, the first User A may propose a database data definition syntax 403A for creating the person's corresponding country data Table 303. Corresponding to relational database table 303 of FIG. 3, the second User B may propose a database data definition syntax 402B for the person's corresponding country data. In proposed definition syntax 403A, User A defines a variable "COORDINATES" as type CLOB 431A, while User B defines a variable "COORDINATES" as type LONG 431B.

Figure 5:
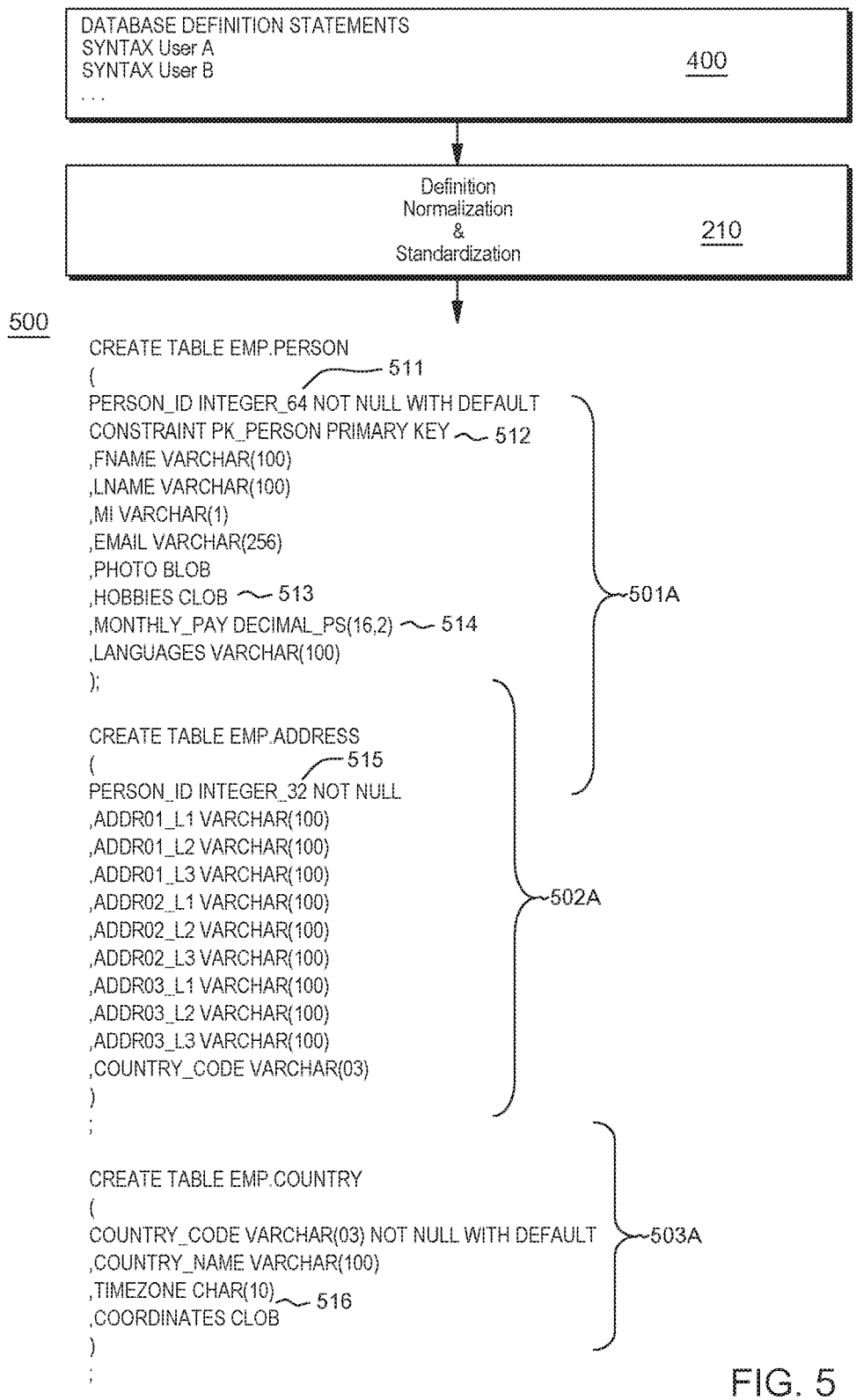
FIG. 5 is an exemplary flowchart illustrating a result of normalizing or standardizing a first database syntax design proposed in FIG. 4 according to one embodiment.

FIG. 5 shows detailed processing of the normalization and standardization process of step 110, FIG. 1 where module 210 performs normalization and standardization operations to conform the syntax of each example user definitions to a standard db definition syntax for the received database definition syntax 400 of FIG. 4. Here, FIG. 5 shows example normalized syntax 501A, 502A, 503A corresponding to User A's proposed data definitions syntax 401A, 402A, 403A, respectively, of FIG. 4. Examples of standardized definitions declarations for normalized syntax 501A as a result of process 110 are shown as including conforming the PERSON_ID key as a type INTEGER (e.g., 64 Bit) at 511 and assigning the PERSON_ID key as primary key (PK) at 512. Another example of standardized definitions declarations for normalized syntax 501A are shown as including conforming the variable "HOBBIES" as a type CLOB at 513 and conforming the variable "MONTHLY PAY" as a DECIMAL type (Tuple) at 514.

Figure 6:
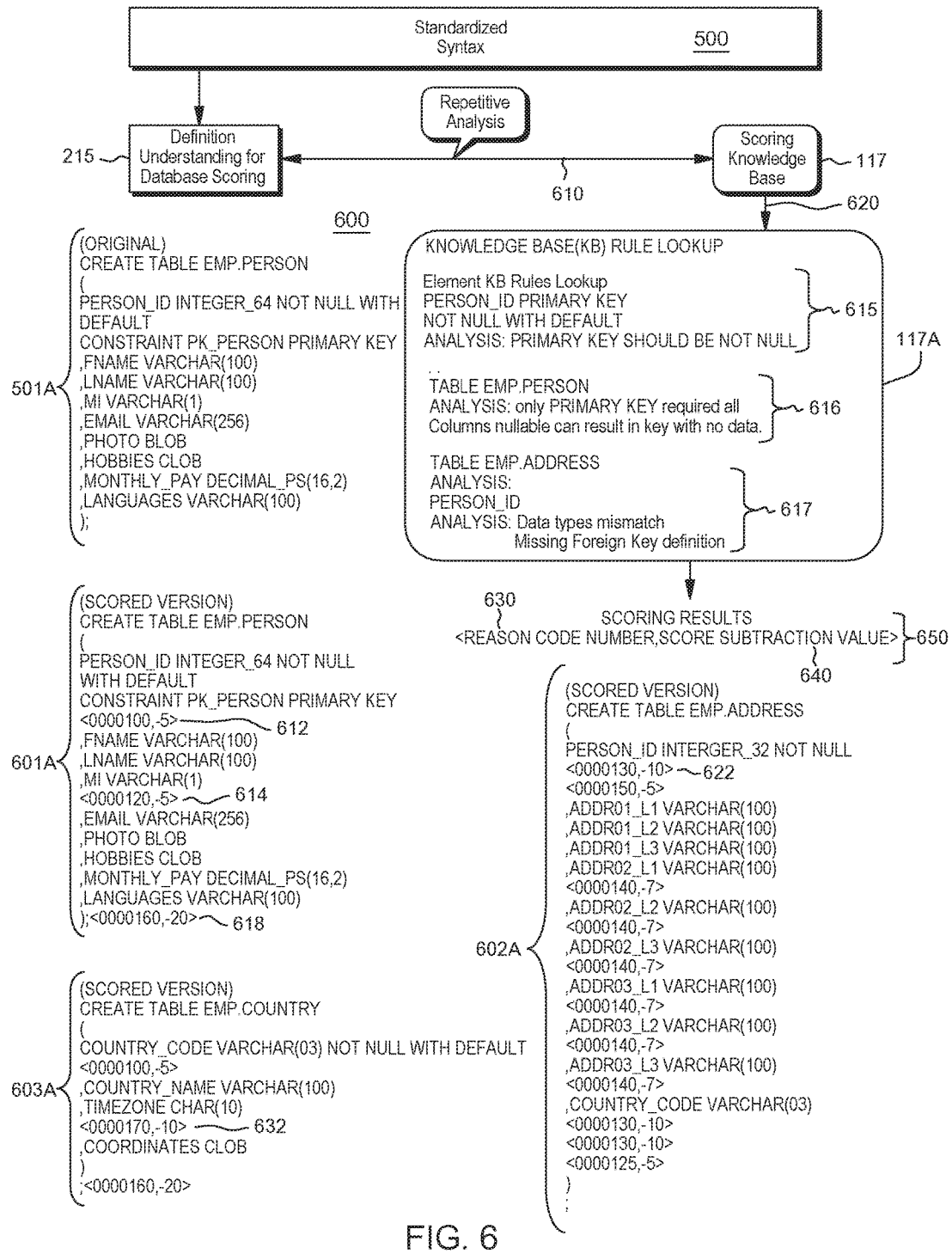
FIG. 6 shows exemplary results of knowledge base lookup scoring performed on the normalized syntax shown in FIG. 5.

FIG. 6 shows detailed processing 600 of understanding and scoring module 215 where machine readable decision operations are performed on the standardized definitions syntax 500 of FIG. 5 to understand the statements for scoring purposes. Corresponding process step 115 includes accessing a scoring knowledgebase 117 that implements decision tree logic to interpret the normalized data definition syntax 500 and understand a context within which to score. The scoring module 215 repeatedly accesses scoring knowledge base repository 117 at 610 where decision trees are used to obtain object design measurements 630, 640 used to return object scoring 650.

In this task, for each variable declaration or statement of an input data definition syntax, the method performs a rule lookup at 620 in knowledge base portion 117A. For example, at step 120 knowledge base is queried for a lookup rule that locates an error or out of context statement and provides the associated analysis. For example, a lookup rule 615 may locate an error or out of context statement when a database Primary Key declaration includes a null value. The corresponding analysis for that element rule indicates that a Primary Key can not be a null value. As a further example, a lookup rule 616 may locate an error or out of context statement when a database definition for Table emp.Person declaration reveals all columns nullable which can result in a key with no data. The corresponding analysis for that element rule indicates that a Table emp.Person can not include all nullable columns which could result in a key with no data. As a further example, a lookup rule 617 may locate a definitions mismatch, where a foreign key exists but is missing a foreign key definition. For example, an data mismatch results when a database definition for Table emp.Address uses a column header Person_ID (Primary Key) but no corresponding foreign key definition. The corresponding analysis for that element rule indicates a data mismatch, use of a primary key column header but no corresponding foreign key definition.

In one embodiment, for database scoring, a user's data is assigned an initial score (e.g., point value), e.g., 1000 points, corresponding to a maximum or "perfect" database score, and for each issue raised by the result of context understanding, points are deducted (decremented) from the current balance based on the decision logic or rule. Decision trees are used to obtain an object design measurement 630 that includes a reason code representing the error (i.e., a description of the determined issue), and a measurement 640 that represents a point value to be deducted or subtracted from the total/current database score balance for use in database object scoring 650.

In one embodiment, as shown in FIG. 6, a result of knowledge base lookup processing 600, scored versions 601A, 601B, 603A are generated for each of the corresponding respective user's scored standardized definitions syntaxes 501A, 502A and 503A analyzed. For example, for normalized syntax 501A, resulting scored version table 601A shows a knowledgebase table lookup score result 612 corresponding to a primary key declaration error and also shows an inserted tuple including a code 000100 and a corresponding deduction point value of −5 (i.e., 5 points to be deducted). A further example knowledgebase table lookup score result 614 corresponds to a variable M1 declaration error with a the syntax showing an inserted tuple including a code 000120 and a corresponding deduction point value of −5. As a further example, for normalized syntax 502A, there result a scored version table 603A indicating a knowledgebase table lookup score result 622 corresponding to two Primary Key definition declaration errors with a first inserted tuple including a code 000130 and a corresponding deduction point value of −10 (i.e., 10 points to be deducted) and a second inserted tuple including a code 000150 and a corresponding deduction point value of −5. As a further example, for normalized syntax 503A, resulting scored version table 603A shows an example knowledgebase table lookup score result 632 corresponding to a variable TIMEZONE declaration error and also shows an tuple inserted into the syntax including a code 000170 and a corresponding deduction point value of −10.

Figure 7:
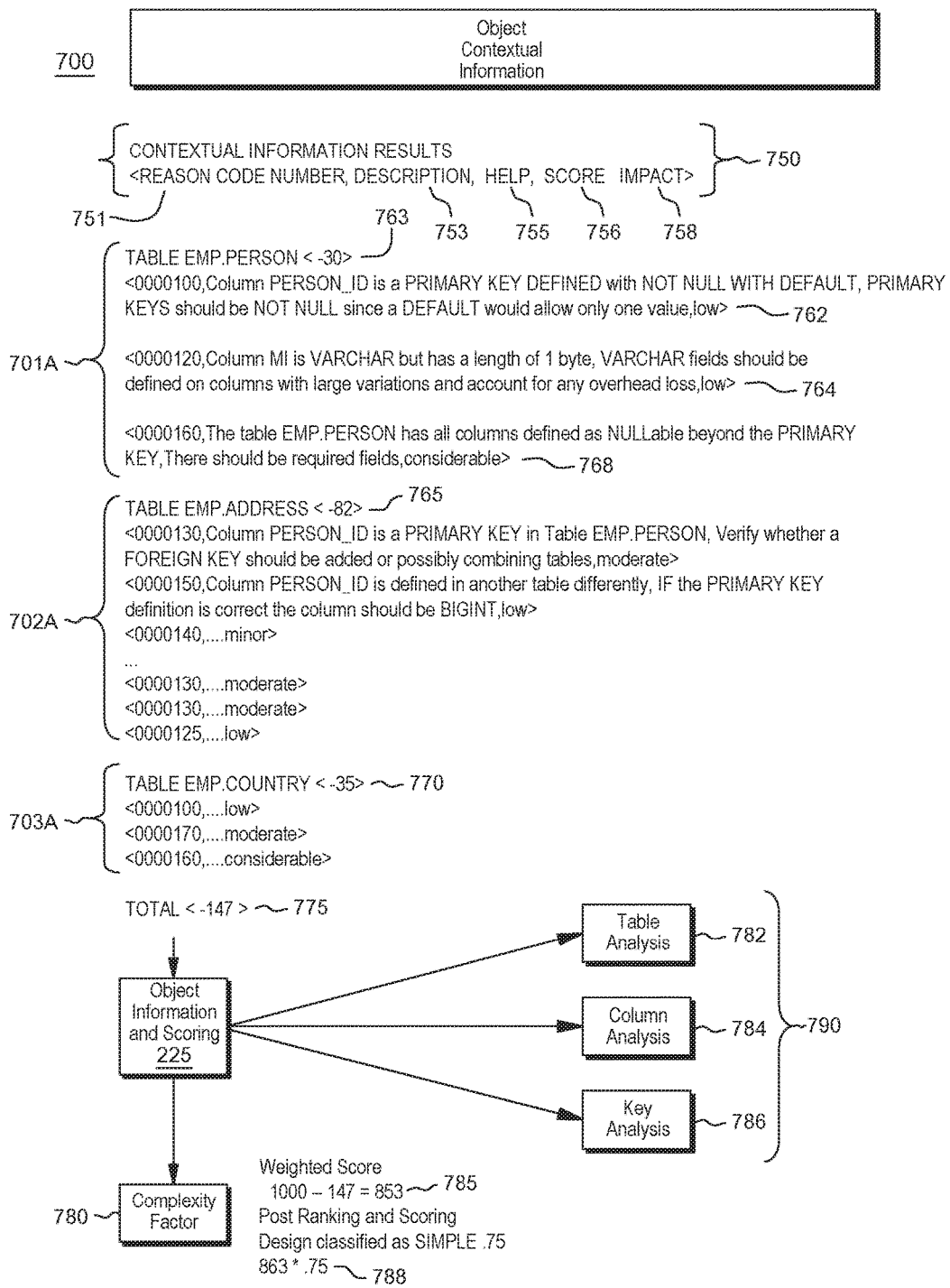
FIG. 7 depicts exemplary results of knowledge base lookup scoring and obtaining of object contextual information for database design definitions syntax performed on the scored syntax versions shown in FIG. 6.

FIG. 7 shows example results 700 generated by aggregating contextual information and corresponding lookup scores for each of the database objects as performed by object contextual information module 220. For example, in one embodiment, as shown in FIG. 7, contextual information found for any aspects of the user's proposed definitions syntax are aggregated as contextual information versions 701A, 701B, 703A for each of the corresponding user's scored syntaxes 601A, 602A and 603A, respectively, of FIG. 6. In one embodiment, an aggregated contextual information result 750 for a database object may include one or more of: a Reason Code Number 751, a Description 753, Help information 755, a Score 756 and an Impact 758.

In one embodiment, the system extracts from the scoring knowledgebase 117 contextual information corresponding to each table lookup result found by the scoring module for a proposed (standardized) definitions syntax. The system further totals the amount of points to be deducted for each issue found by the decision trees. For example, for scored syntax 601A of FIG. 6, the system generates a contextual information summary 701A showing the contextual information look-up results 762, 764, and 768 corresponding a respective knowledgebase lookup score result 612 (e.g., a tuple code indicating a primary key declaration error having a point deduction=−5) result 614 (e.g., a tuple code indicating a variable type declaration error having a point deduction=−5), and a result 618 (e.g., a table column error having a point deduction=−20). Thus as shown, an aggregated points deduction 763 would be 30 points for this user's proposed table definition syntax 401A, corresponding to person data table 301. As further shown, for example scored syntax 602A of FIG. 6, the system generates a contextual information summary 702A showing the contextual information look-up results corresponding to respective knowledgebase lookup score results (e.g., inserted tuple codes). Thus as shown, an aggregated points deduction 765 would be 82 points for this user's proposed definition syntax 402A, corresponding to person address data table 302. Likewise, for example scored syntax 603A of FIG. 6, the system generates a contextual information summary 703A showing the contextual information look-up results corresponding to respective knowledgebase lookup score results. Thus as shown, an aggregated points deduction 770 would be 35 points for this user's proposed definition syntax 403A, corresponding to person address data table 303.

The system further computes a total amount of points 775 to be deducted for these definition syntaxes as 82+35+30=147 points total deducted with the corresponding context indicated. The system at 785 further computes a Weighted Score for this design as a difference between the initialized design amount (e.g., 1000 points) and the total points deducted (e.g., 147 in this example shown) to result in a raw score of (1000−147=853 points).

FIG. 7 further shows the object information and scoring module 225 further performing a design complexity analysis 790 including a database design table analysis 782, a database design column analysis 784 and a database table key analysis 786 which analyses results are used to generate a complexity factor. In one embodiment, at 788, the system generates a complexity factor at 780 that may be a percentage value, e.g., 75% or 0.75 for a design complexity classified as "Simple"), and at 788 multiplies this complexity factor against the Weighted Score (point) value (in this example 853 points) to result in a Total weighted database score of 639.

In a further embodiment, the system generates a database object self help report 800 as shown in FIG. 8 which includes the Total weighted database score and its design classification 802 (e.g., a total of 639 points for the "Simple" design shown in the example). In one embodiment, as shown in FIG. 8, the generated report 800 shows for each user's initial proposed definitions syntax (e.g., 401A, 401B, 401C for the three database tables 301, 302, 303, respectively) the corresponding reported versions 801A, 802A, 803A for each of the corresponding user's scored syntaxes 601A, 602A and 603A, respectively, of FIG. 6 and contextualized in generated syntaxes 701A, 702A and 703A, respectively, of FIG. 7. For example, the generated report includes for each corresponding issue that was found guidance for the user in the form of a description of the context in which the error or issue was found. For the example report version 801A, there is shown highlighted respective context 862, 864 and 868 corresponding to the contextual information look-up results 762, 764, and 768 indicating the issues found in the proposed database design syntax for the Person Data table as a result of the applied methods.

In one embodiment, the generated self-help report 800 such as shown in FIG. 8 provides an associated database design score and associated contextual information regarding the database objects of the database design definitions considered. The report 800 may be displayed at a user's device, such as the user who proposed the database design, or alternatively, communicated, e.g., over a wired or wireless communications system(s), or both, to inform the user, e.g., via a data or a display interface at a user computing device, as to the quality of that user's database design definitions and indicate ways in which the user's database design definitions may be improved.

Figure 9A:
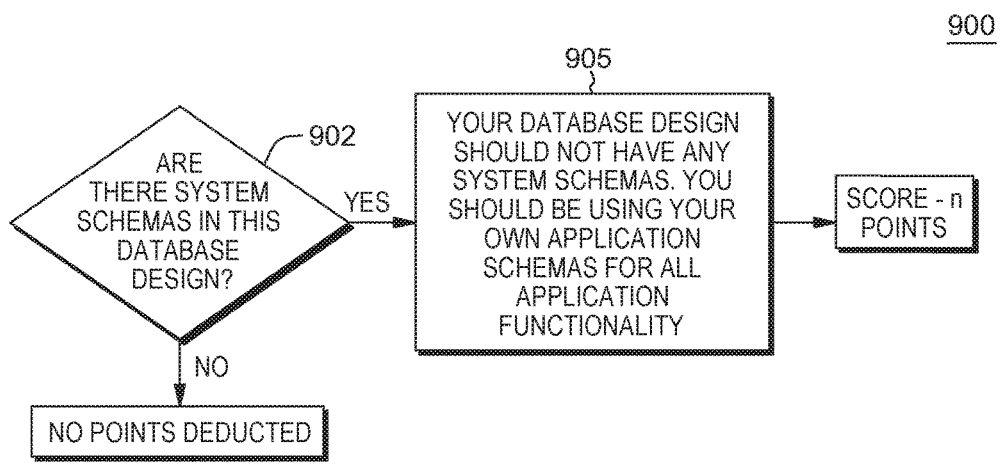
FIG. 9A depicts an example of a decision tree logic asking whether there are system schemas included in the database design.
Figure 9B:
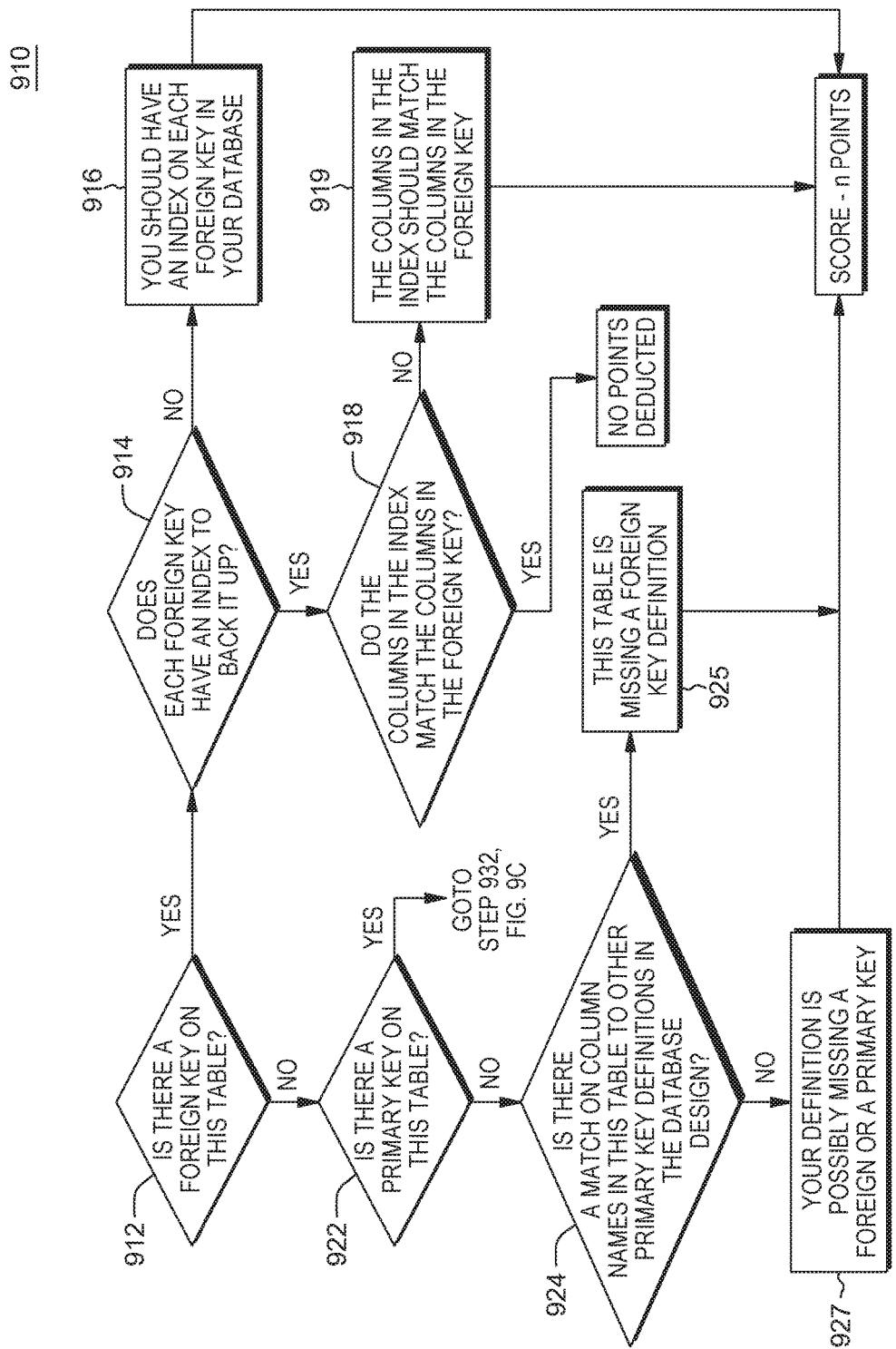
FIG. 9B and FIG. 9C depict another example of decision tree logic employed to perform key evaluation in one embodiment.
Figure 9C:
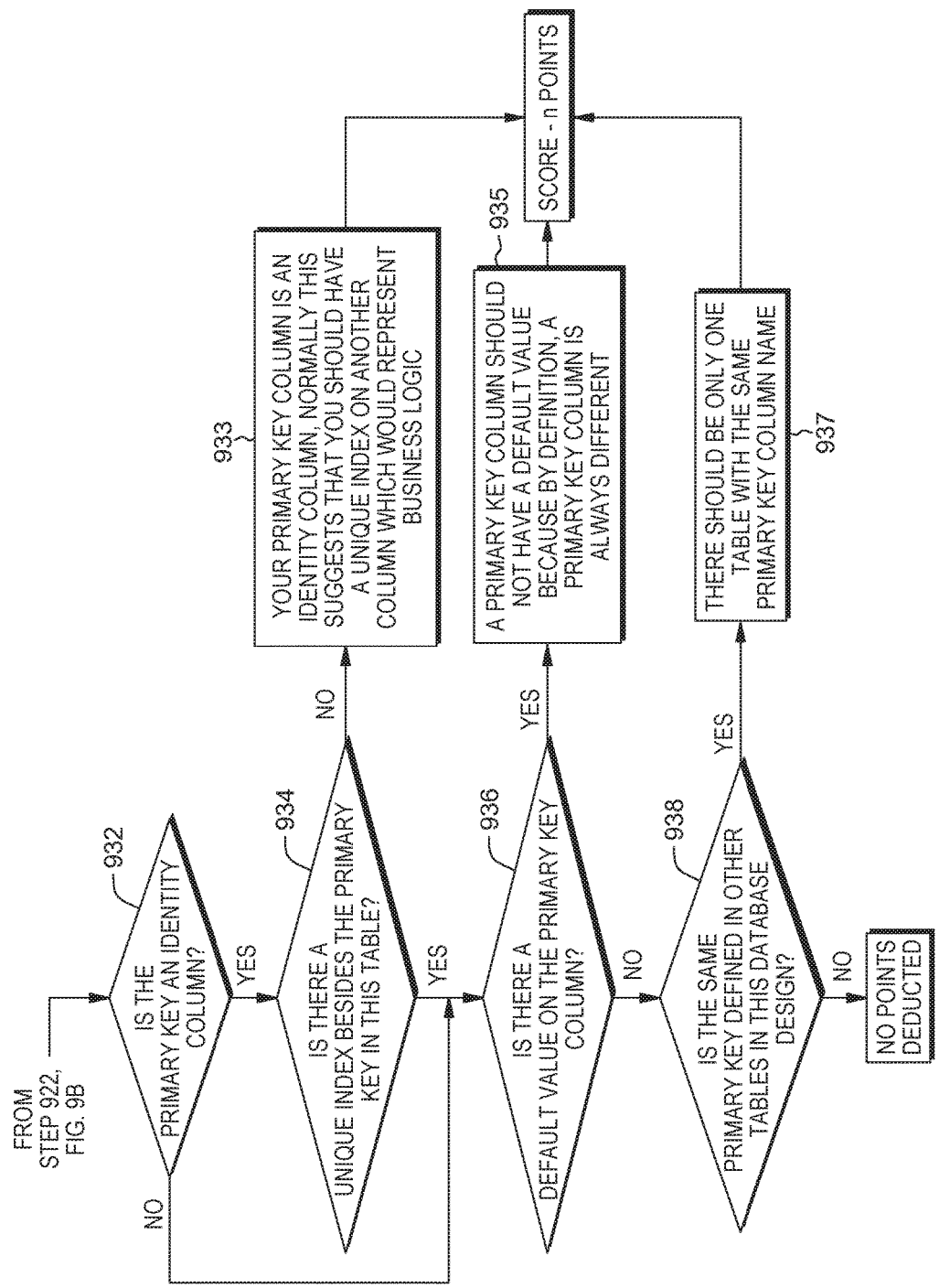
Figure 9D:
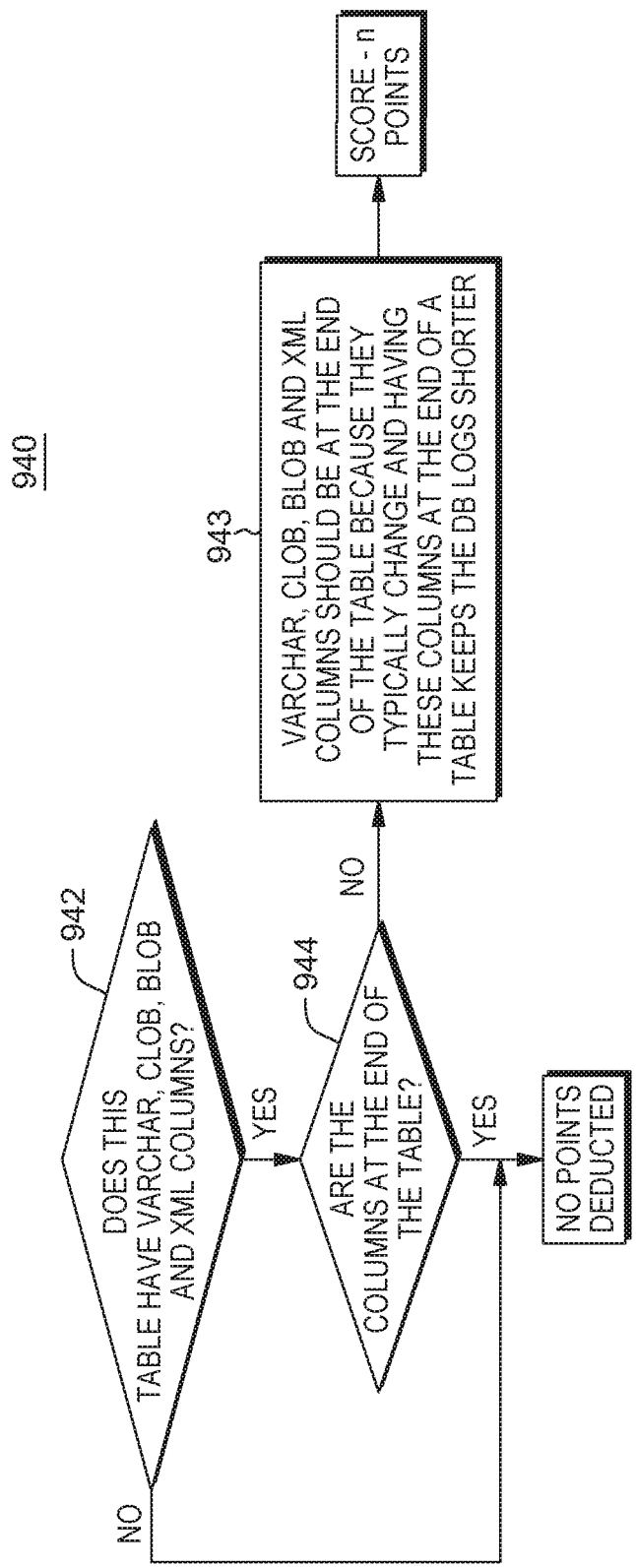
FIG. 9D depicts another example of decision tree logic employed to perform a check for column placement for large column types.
Figure 9E:
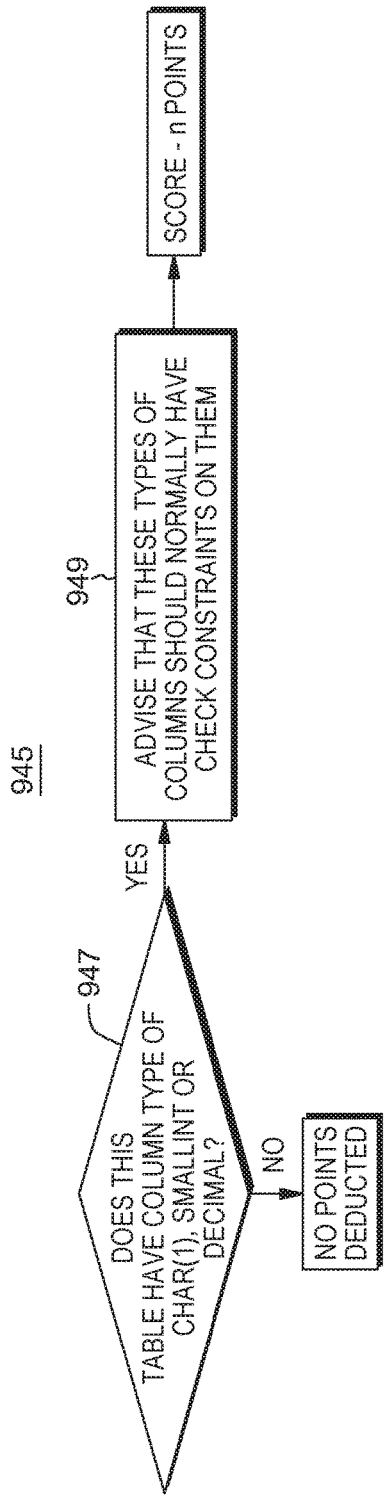
FIG. 9E depicts another example of decision tree logic employed to perform missing check constraint evaluation.
Figure 9F:
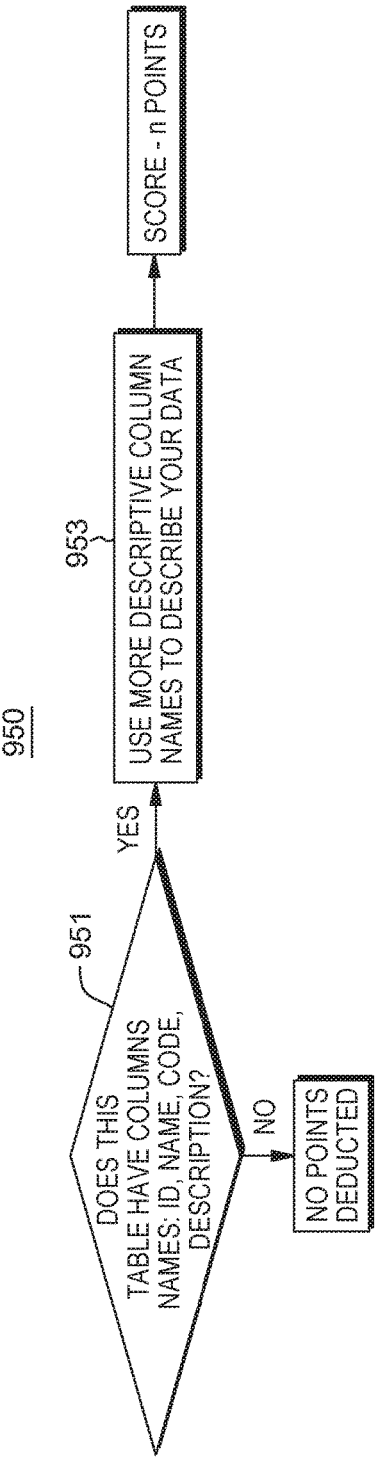
FIG. 9F depicts another example of decision tree logic employed to perform column name evaluation.
Figure 9G:
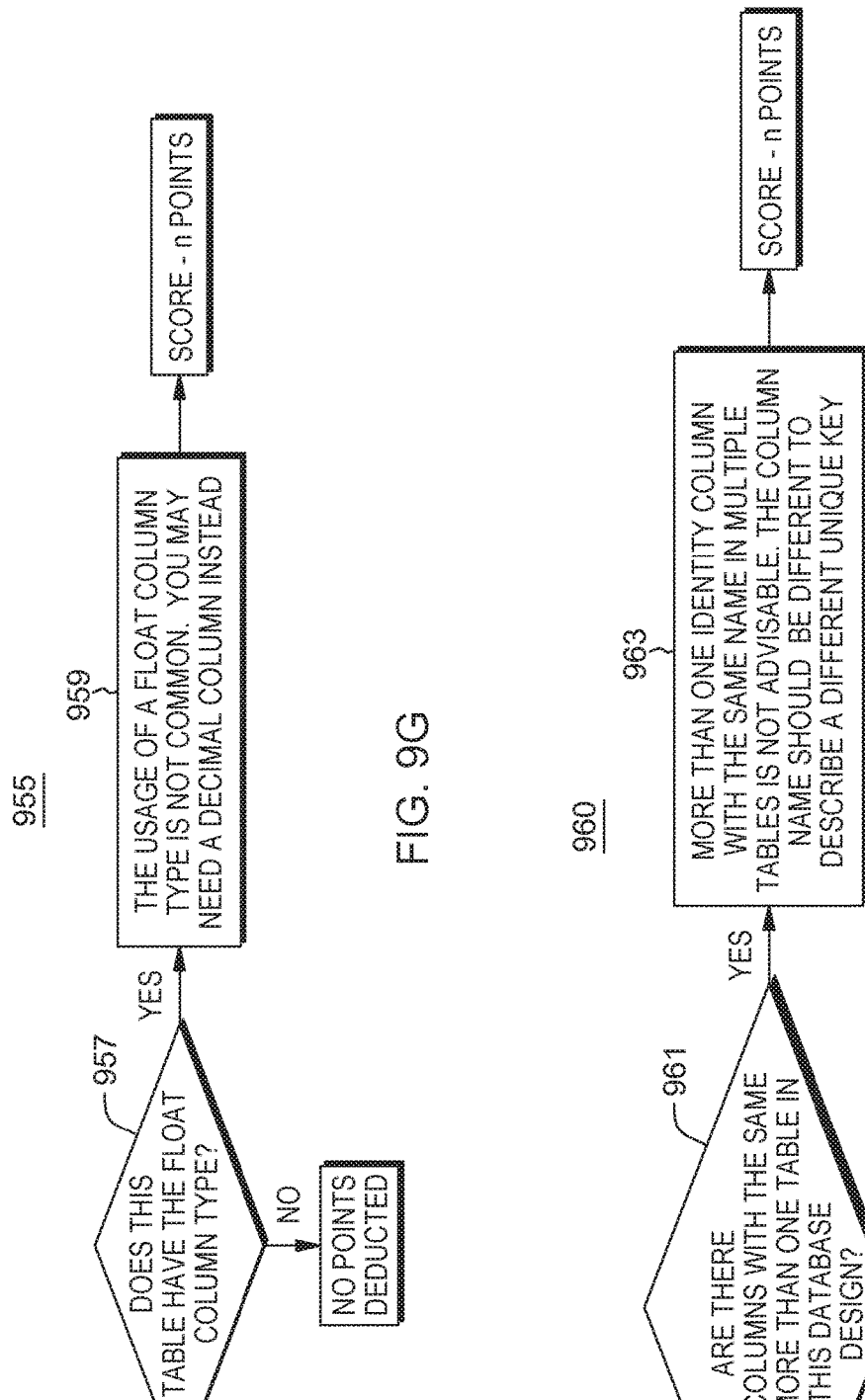
FIG. 9G depicts another example of decision tree logic employed to perform a float column type evaluation.
Figure 9H:
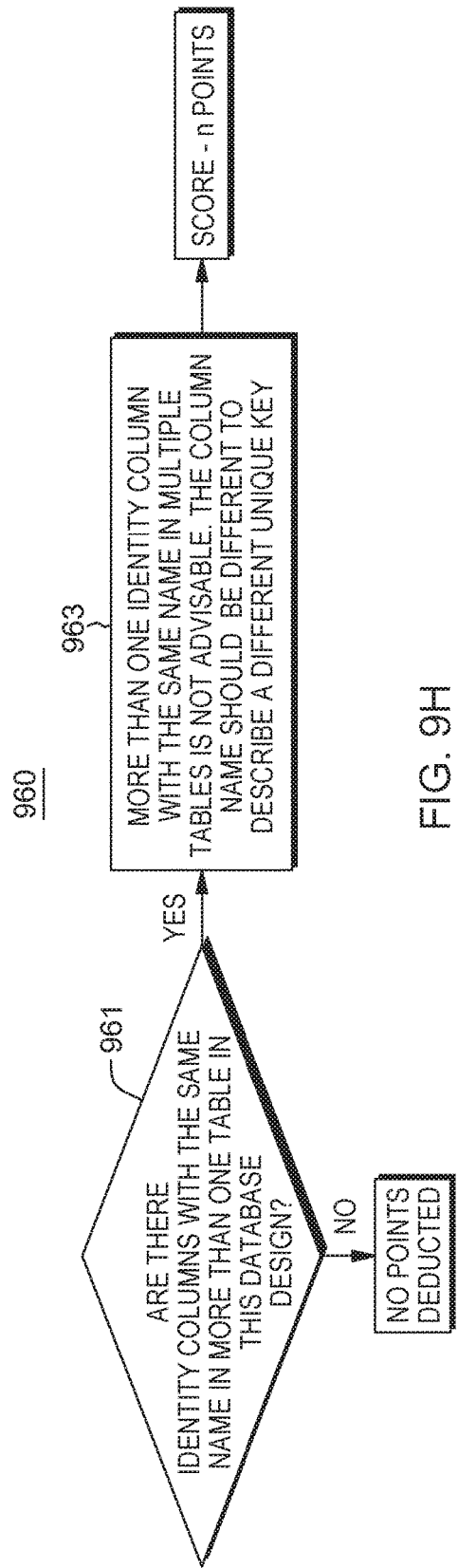
FIG. 9H depicts another example of decision tree logic employed to perform an identity column type evaluation.
Figure 9K:
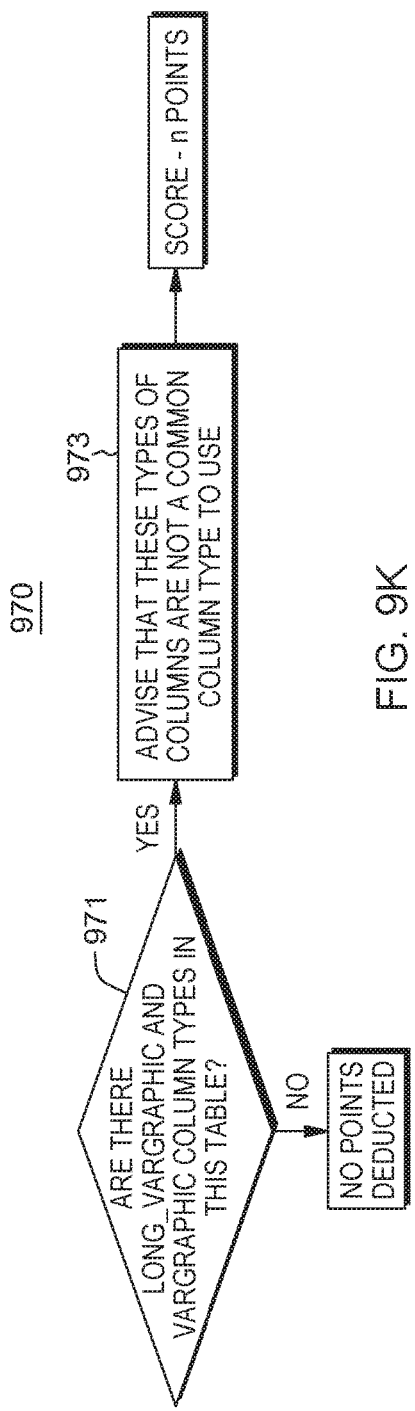
FIG. 9K depicts another example of decision tree logic employed to perform an evaluation on long vargraphic and vargraphic column types.
Figure 9L:
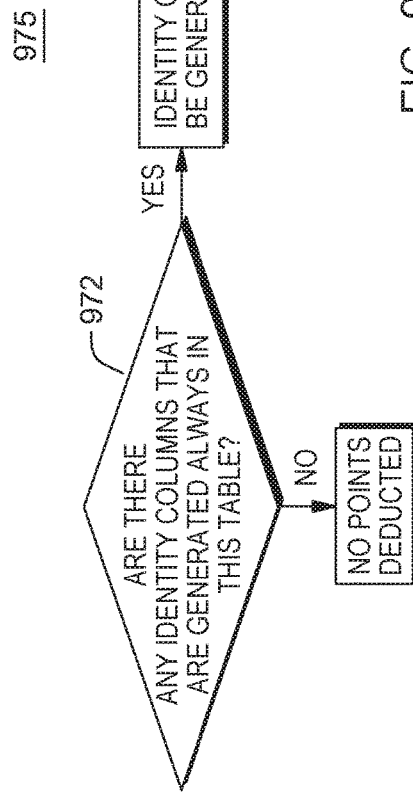
FIG. 9L depicts another example of decision tree logic employed to perform a check on identity columns to determine if they are generated always.
Figure 9M:
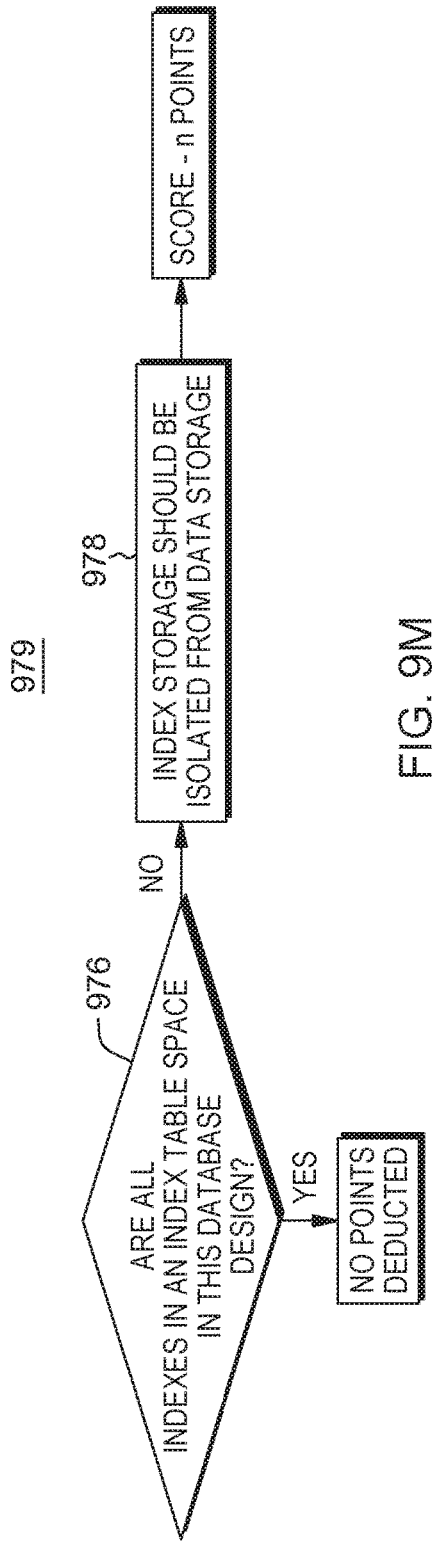
FIG. 9M depicts another example of decision tree logic employed to perform an index table space evaluation.
Figure 9N:
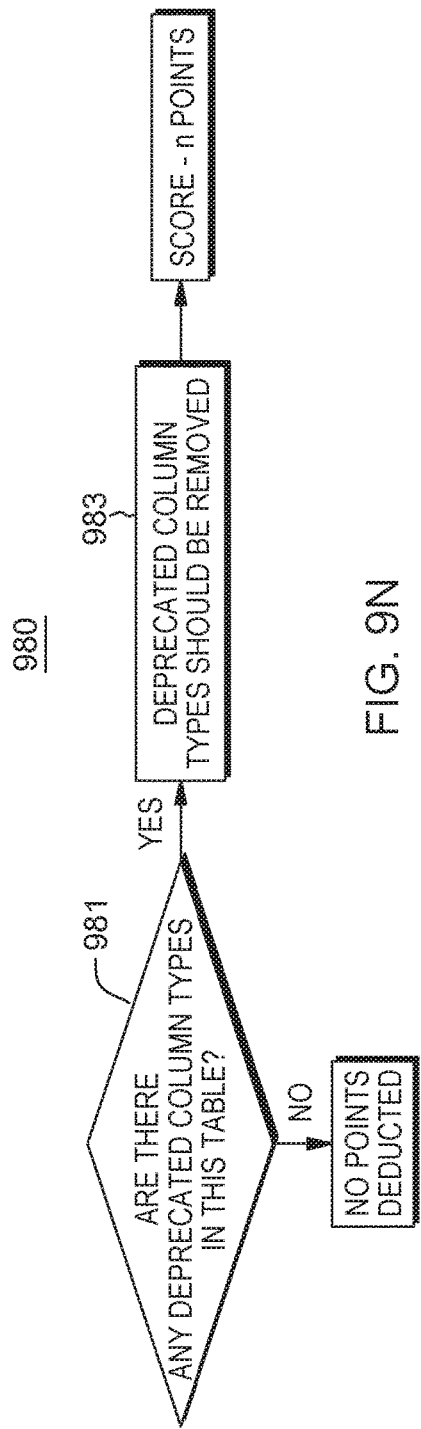
FIG. 9N depicts another example of decision tree logic employed to perform a deprecated column evaluation.
Figure 9O:
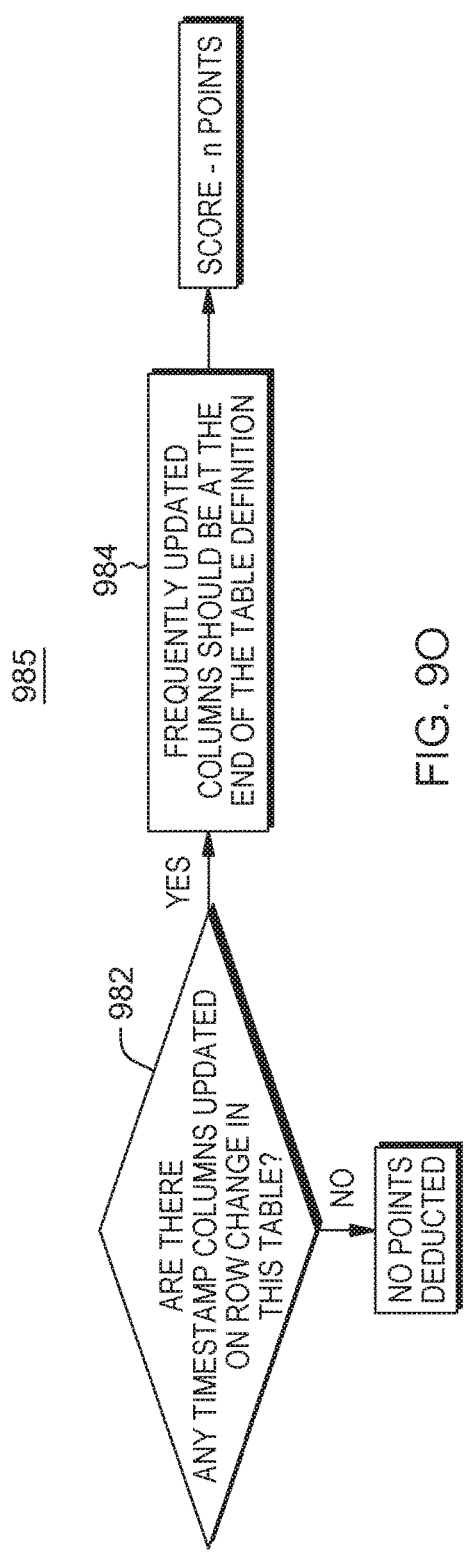
FIG. 9O depicts another example of decision tree logic employed by the methods of FIG. 1 to perform a timestamp column evaluation.
Figure 9P:
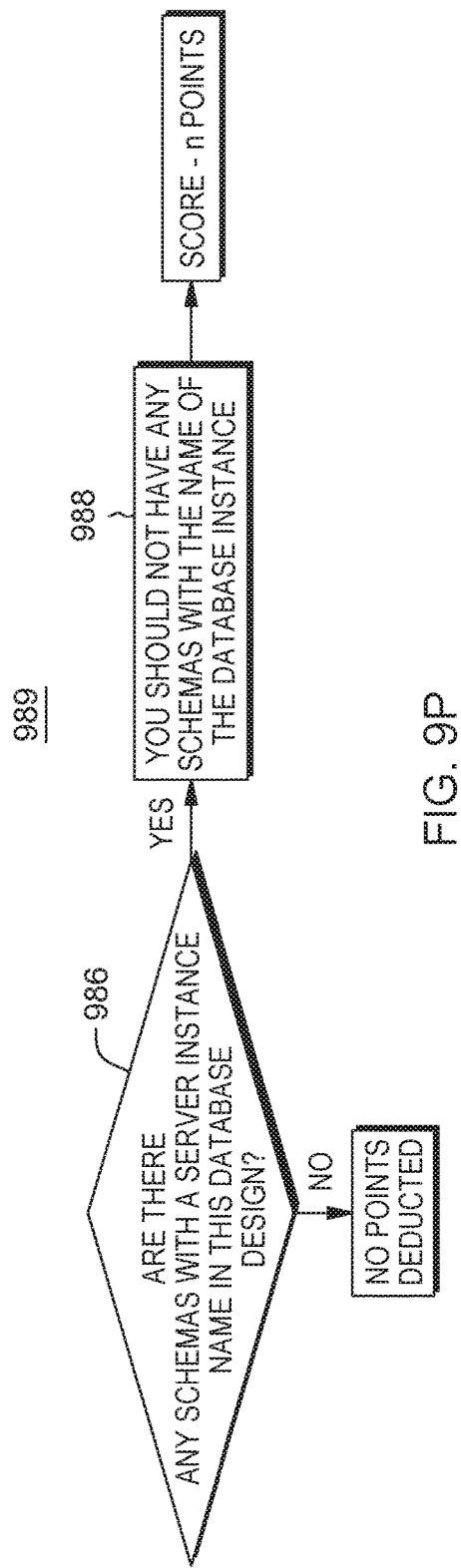
FIG. 9P depicts another example of decision tree logic employed to perform a schema name evaluation.
Figure 9Q:
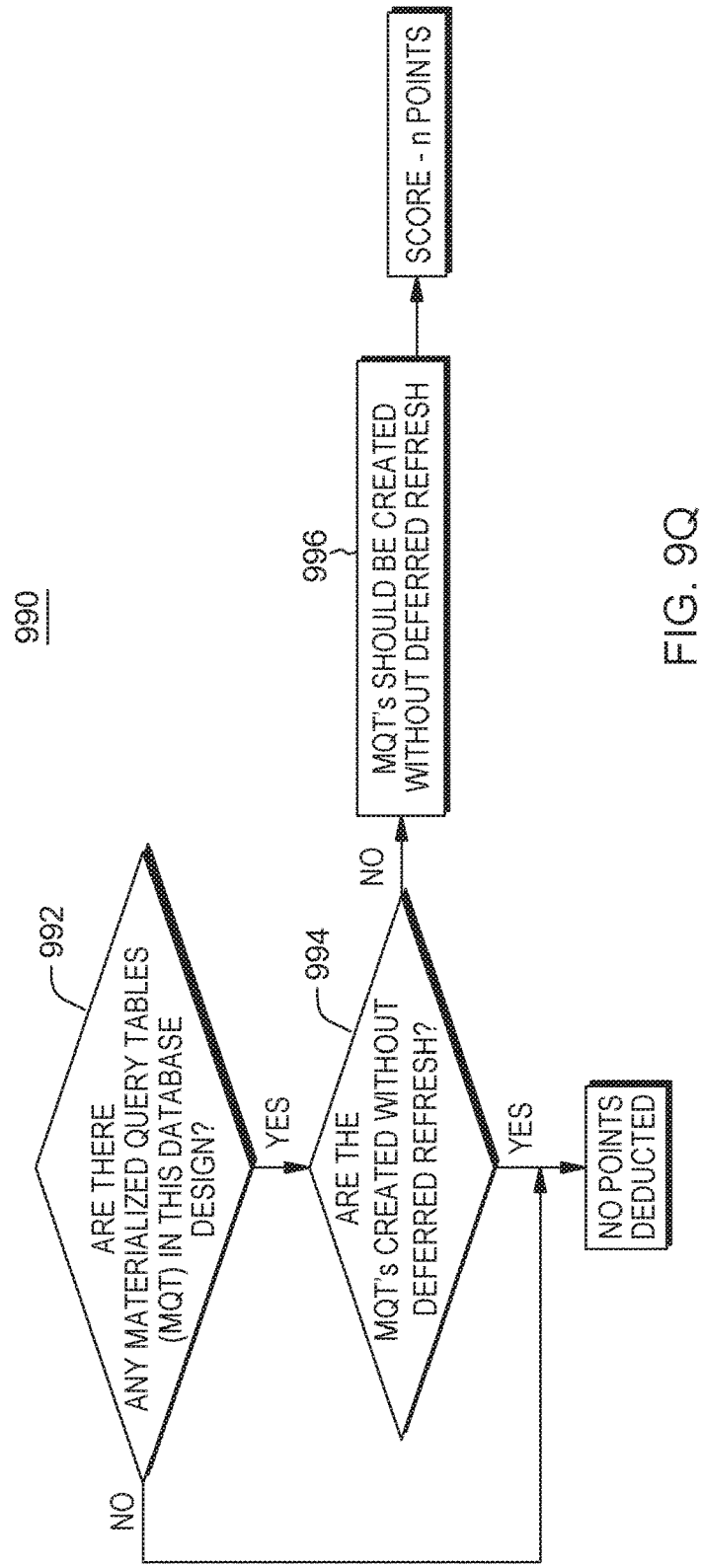
FIG. 9Q depicts another example of decision tree logic employed by the methods of FIG. 1 to perform an MQT evaluation.
Figure 9T:
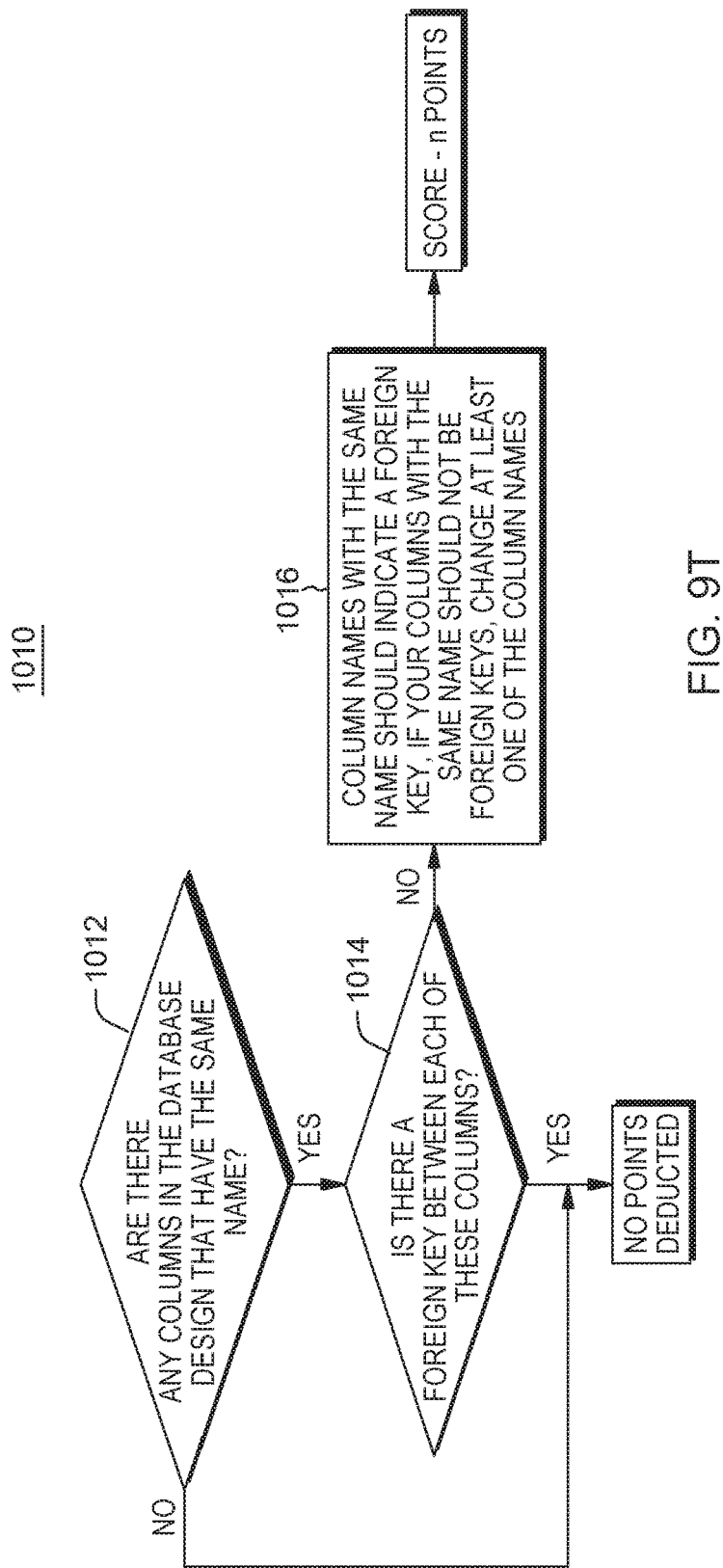
FIG. 9T depicts another example of decision tree logic employed to perform another column name evaluation.
Figure 9U:
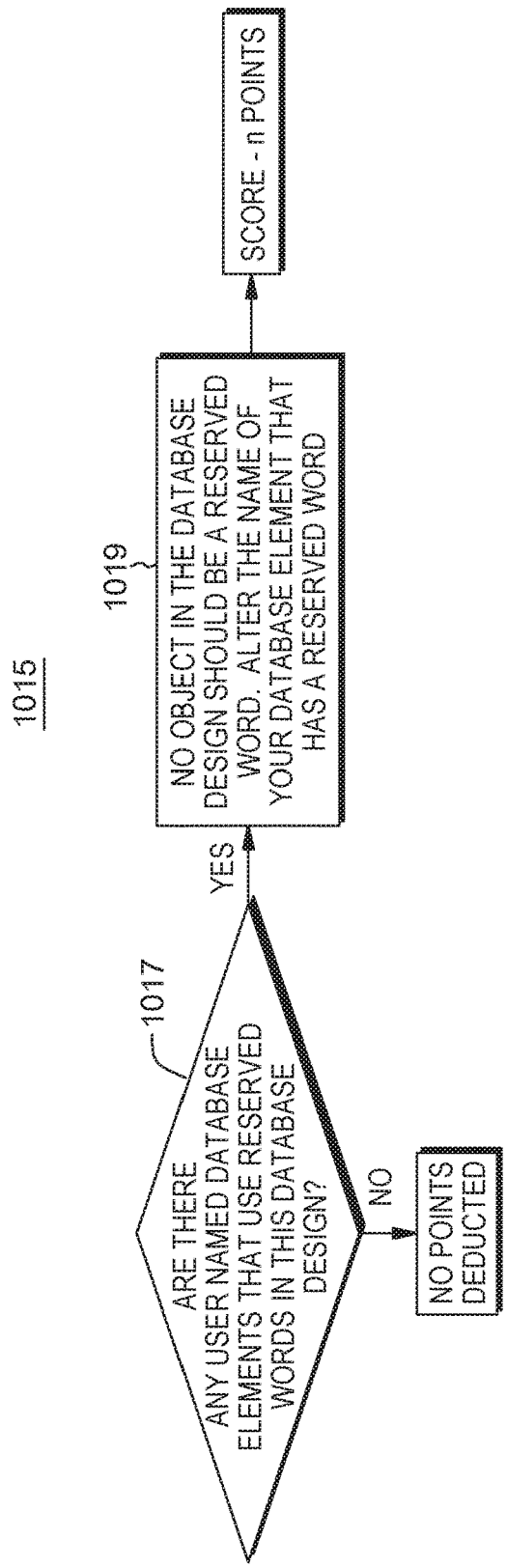
FIG. 9U depicts another example of decision tree logic employed to perform a database element name evaluation checking for reserved words.

FIGS. 9A-9U depict non-limiting example decision tree operations 900 and rules implemented inside the scoring knowledgebase 117 that the database understanding and scoring module 215 accesses for understanding context for database scoring. The decision tree logic encapsulate rules that run on the definition syntax to understand the statements for scoring purposes. This encapsulates decision tree logic is embodied as machine code used to interpret the data definition syntax and statements, and understand a context (i.e., the reasons) within which to score. According to these methods, the knowledge base repository of design information and decision trees are used to obtain object design measurements used to return object scoring, as guidance for a database designer.

One decision tree 900 is initial shown in FIG. 9A which determines at 902 whether the user's proposed database design implements any system schemas. If the decision trees detect that a user's proposed database design implements any system schema, then a context statement (reason) is identified at 905 to indicate a context that the database design should not have any system schemas and that the user should be using his/her own application schemas for all application functionality. A corresponding points amount "n" will be consequently deducted from the current database score. Otherwise, at 902, if the decision trees detect that a user's proposed database design does not implement any system schema, then there is no issue and no points would be deducted.

A further decision tree 910 is shown in FIG. 9B for performing key evaluation by determining at 912 whether the user's proposed database table design syntax implements a foreign key. If the decision tree logic detects that a user's proposed database table design implements a foreign key, then a further determination is made at 914 to determine whether each foreign key detected has an index to back it up. If it is determined at 914 that one or more foreign keys detected do not have an index to back it up, then a context statement (reason) is identified at 916 to indicate that each foreign key implemented in a design syntax for a database table must have an associated index. A corresponding points amount "n" will be consequently deducted from the current score. Otherwise, returning to 914, if the decision trees detect that each foreign key in a user's proposed database table design does have an index to back it up, then the process proceeds to 918 where a determination is made as to whether the columns in the index match the columns in the foreign key. If at 918 it is detected that the columns in the index do match the columns in the foreign key, then no context issue is generated and no points deducted. Otherwise, at 918, if it is determined that the columns in the index do not match the columns in the foreign key, then a context statement (reason) is identified at 919 indicating that the columns in the index must match the columns in the foreign key and a corresponding points amount "n" will be consequently deducted from the current score.

Returning back to 912, FIG. 9B, if the decision tree logic detects that a user's proposed database table design does not implement a foreign key, then a further determination is made at 922 to determine whether the user's proposed database table design implements a primary key. If it is detected that a primary key is implemented, the process proceeds to step 932, FIG. 9C to continue performing key evaluation. Otherwise, it the decision tree logic detects that a primary key is not implemented, then the method proceeds to 924 where a determination is made as to whether there a match on column names in this table to other primary key definitions in the database design. If it is detected that there is a match on column names in this table to other primary key definitions in the database design, then the process proceeds to 925 where the system generates a context statement (reason) is identified indicating that the table is missing a foreign key definition, and a corresponding points amount "n" will be consequently deducted from the current score. Otherwise, at 924, if it determined that there is no match on column names in this table to other primary key definitions in the database design, then the process proceeds to 927 where the system identifies a context statement (reason) indicating that the table definition is missing a foreign or primary key and a corresponding points amount "n" will be consequently deducted from the current score.

Returning to step 922, FIG. 9B if it is determined that there is a primary key in the proposed user's database table design, then the method proceeds to step 932, FIG. 9C to determine whether the primary key is an identity column. If it is determined that the primary key is an identity column, the process proceeds to step 934 where a determination is made as to whether there a unique index besides the primary key in the table. If it is further determined that there is no unique index besides the primary key in the table then the process proceeds to 933 where the system obtains a context statement (reason) indicating that the primary key column is an identity column which would normally suggest that there should be a unique index on another column which would represent business logic, and a corresponding points amount "n" will be consequently deducted from the current score. Otherwise, at 934, if it is determined that there is a unique index besides the primary key in the table, then the process proceeds to 936 where a determination is made as to whether there is a default value on the primary key column. If it is determined that there is a default value on the primary key column, then the process proceeds to 935 where the system obtains a context statement (reason) indicating that the primary key column should not have a default value because by definition, a primary key column is always different. A corresponding points amount "n" will be consequently deducted from the current score. Otherwise, returning to 936, if it is determined that there is no default value on the primary key column, the process proceeds to 938 where a determination is made as to whether the same primary key has been defined in other tables in this database design. If decision tree logic detects that the same primary key is defined in other tables in this database design, then the process proceeds to 937 where the system obtains a context statement (reason) indicating that there should be only one table with the same primary key column name, and correspondingly deducting an amount "n" of points from the current score. Otherwise, returning back to 938, if it is determined that the same primary key is not defined in other tables in this database design, then there is no context issue and consequently no points deducted.

A further decision tree 940 is shown in FIG. 9D which performs a check for column placement for large column types by determining at 942 whether the user's proposed database table design syntax declares varchar, clob, blob and xml columns. If the decision tree logic detects that a user's proposed database table design implements varchar, clob, blob and xml columns, then a further determination is made at 944 to determine whether those detected columns are at the end of the table. If it is determined at 944 that those detected columns are not at the end of the table, then a context statement (reason) is identified at 943 to indicate that the Varchar, clob, blob and xml columns should be at the end of the table because they typically change, and having these columns at the end of a table keeps the db logs shorter. A corresponding points amount "n" will be consequently deducted from the current score. Otherwise, returning to 944, if the decision trees detect that those detected columns are at the end of the table, then there is no context issue and no points deducted. Further, returning to 942, if is initially determined that the proposed database table design syntax does not have varchar, clob, blob and xml columns, then no points are deducted.

A further decision tree 945 is shown in FIG. 9E to perform a missing check constraint evaluation by determining at 947 whether the user's proposed database table design declarations have column type of char(1), smallint or decimal. If the decision tree logic detects that a user's proposed database table design implements a column type of char(1), smallint or decimal, then a context statement (reason) is identified at 949 to indicate that these types of columns should normally have check constraints on them, and consequently, a corresponding points amount "n" will be deducted from the current score. Otherwise, at 947, if it is determined that the user's proposed database table design does not have column type of char(1), smallint or decimal type, then there is no issue and consequently no points deducted.

A further decision tree 950 is shown in FIG. 9F which logic performs column name evaluation by determining at 951 whether the user's proposed database table design declarations have columns names: ID, NAME, CODE, or DESCRIPTION. If the decision tree logic 950 detects that a user's proposed database table design implements a column having a name: ID, NAME, CODE, or DESCRIPTION, then a context statement (reason) is identified at 953 to indicate that a more descriptive column name to describe the data should be used, and consequently, a corresponding points amount "n" will be deducted from the current score. Otherwise, at 951, if it is determined that the user's proposed database table design does not have column names ID, NAME, CODE, or DESCRIPTION, then there is no issue and consequently no points deducted.

A further decision tree 955 is shown in FIG. 9G which logic performs a float column type evaluation by determining at 957 whether the user's proposed database table design declarations have a "float" column type. If the decision tree logic 955 detects that a user's proposed database table design implements a float column, then a context statement (reason) is obtained at 959 to indicate that usage of a float column type is not common and that the user may need a decimal column instead. Consequently, a corresponding points amount "n" will be deducted from the current score. Otherwise, at 957, if it is determined that the user's proposed database table design does not have a float column type, then there is no issue and consequently no points deducted.

A further decision tree 960 is shown in FIG. 9H which logic performs an identity column type evaluation by determining at 961 whether the user's proposed database design includes identity columns with the same name in more than one table in the database design. If the decision tree logic 960 detects that a user's proposed database table design does implement identity columns with the same name in more than one table in the database design, then a context statement (reason) is obtained at 963 to indicate that more than one identity column with the same name in multiple tables is not advisable, and that the column name should be different to describe a different unique key. Consequently, a corresponding points amount "n" will be deducted from the current score. Otherwise, at 961, if it is determined that the user's proposed database table design does not include identity columns with the same name in more than one table in the database design, then there is no issue and consequently no points deducted.

A further decision tree 965 is shown in FIG. 9I which logic performs an evaluation on varchar column types larger than 2 k by determining at 967 whether the user's proposed database table design includes any varchar columns greater than 2 k (length) in this table. If the decision tree logic 967 detects that a user's proposed database table design does implement a varchar column greater than 2 k, then a context statement (reason) is obtained at 969 to indicate that it is more efficient to declare and use a clob or a blob column instead, and a corresponding points amount "n" will be consequently deducted from the current score. Otherwise, at 967, if it is determined that the user's proposed database table design does not implement a varchar column greater than 2 k, then there is no issue and consequently no points deducted.

A further decision tree 969 is shown in FIG. 9J which logic performs a check on clob or blob column types by determining at 962 whether the user's proposed database table design includes any clob or blob columns. If the decision tree logic 962 detects that a user's proposed database table design does implement a clob or blob column(s), then a further determination is made at 964 as to whether the proposed table design is in a long table space. If at 964 it is determined that the table is not in a long table space, then a context statement (reason) is obtained at 966 to indicate that tables with large objects would benefit from being stored by isolating their storage. Consequently, a corresponding points amount "n" will be deducted from the current score. Otherwise, at 962, if it is determined that the user's proposed database table design does not implement a clob or blob column, or, at 964, if it determined that then there is defined a clob or blob column and the defined table is in a long table space, then there is no issue and consequently no points deducted.

A further decision tree 970 is shown in FIG. 9K which logic performs an evaluation on long vargraphic and vargraphic column types by determining at 971 whether the user's proposed database table design includes any Long_vargraphic and vargraphic column types. If the decision tree logic 971 detects that a user's proposed database table design does implement a Long_vargraphic and vargraphic column type, then a context statement (reason) is obtained at 973 to advise that these types of columns are not a common column type to use, and a corresponding points amount "n" will be consequently deducted from the current score. Otherwise, at 971, if it is determined that the user's proposed database table design does not define any Long_vargraphic and vargraphic column type, then there is no issue and consequently no points deducted.

A further decision tree 975 is shown in FIG. 9L which logic performs a check on identity columns to determine if they are generated always by determining at 972 whether the user's proposed database table design includes any identity columns that are always generated in this table. If the decision tree logic 972 detects that a user's proposed database table design does implement identity columns that are always generated in this table, then a context statement (reason) is obtained at 974 to advise that these identity columns should be generated by default, and a corresponding points amount "n" will be consequently deducted from the current score. Otherwise, at 972, if it is determined that the user's proposed database table design includes identity columns that are not always generated, then there is no issue and consequently no points deducted.

A further decision tree 979 is shown in FIG. 9M which logic performs index table space evaluation by determining at 976 whether the user's proposed database table design includes all indexes in an index table space. If the decision tree logic 976 detects that a user's proposed database table design does not include all indexes in an index table space, then a context statement (reason) is obtained at 978 to advise that index storage should be isolated from data storage, and a corresponding points amount "n" will be consequently deducted from the current score. Otherwise, at 976, if it is determined that the user's proposed database table design includes all indexes in an index table space, then there is no issue and consequently no points deducted.

A further decision tree 980 is shown in FIG. 9N which logic performs deprecated column evaluation by determining at 981 whether the user's proposed database table design includes any deprecated (obsolete) column types. If the decision tree logic 981 detects that a user's proposed database table design does include deprecated column types, then a context statement (reason) is obtained at 983 to advise that deprecated column types should be removed, and a corresponding points amount "n" will be consequently deducted from the current score. Otherwise, at 981, if it is determined that the user's proposed database table design includes no deprecated column types, then there is no issue and consequently no points deducted.

A further decision tree 985 is shown in FIG. 9O which logic performs a timestamp column evaluation by determining at 982 whether the user's proposed database table design includes any timestamp columns used with the database feature update on row change. If the decision tree logic 982 detects that a user's proposed database table design does include a timestamp column(s) updated on row change, then a context statement (reason) is obtained at 984 to advise that frequently updated columns should be at the end of the table definition, and a corresponding points amount "n" will be consequently deducted from the current score. Otherwise, at 982, if it is determined that the user's proposed database table design includes no timestamp columns updated on a row change, then there is no issue and consequently no points deducted.

A further decision tree 989 is shown in FIG. 9P which logic performs schema name evaluation by determining at 986 whether the user's proposed database table design includes any schemas with a server installation name. If the decision tree logic 986 detects that a user's proposed database table design does include a schema(s) with a server instance name, then a context statement (reason) is obtained at 988 to advise that the user should not have any schemas with the name of the database instance, and a corresponding points amount "n" will be consequently deducted from the current score. Otherwise, at 986, if it is determined that the user's proposed database table design includes no schemas with a server instance name, then there is no issue and consequently no points deducted.

A further decision tree 990 is shown in FIG. 9Q which logic determines at 992 whether the user's proposed database table design includes any materialized query tables (MQT). If the decision tree logic 992 detects that a user's proposed database table design includes a MQT, then a further decision is made at 994 to determine whether the MQT have been created without deferred refresh. If, at 994, it is determined that no MQT's have been created without deferred refresh, then a context statement (reason) is obtained at 996 to advise that MQT's should be created without deferred refresh, and a corresponding points amount "n" will be consequently deducted from the current score. Otherwise, at 994, if it is determined that the user's proposed database table design includes MQT's created without deferred refresh, then there is no issue detected and consequently no points deducted. Returning to 992, if it is determined that there are no MQT tables in the user's proposed database table design, then there is no issue and consequently no points deducted.

A further decision tree 1000 is shown in FIG. 9R which logic performs an evaluation on indexes by determining at 1002 whether the user's proposed database table design includes any indexes with a varchar column. If the decision tree logic 1002 detects that a user's proposed database table design does include an index with a varchar column, then a context statement (reason) is obtained at 1004 to advise that indexes with varchar columns add more overhead to an index and that the user should verify if that index is really needed. Consequently, a corresponding points amount "n" will be deducted from the current score. Otherwise, at 1002, if it is determined that the user's proposed database table design includes no indexes with a varchar column, then there is no issue and consequently no points deducted.

A further decision tree 1005 is shown in FIG. 9S which logic performs another evaluation on indexes per table by determining at 1007 whether the user's proposed database table design includes more than three (3) single column indexes in the table. If the decision tree logic 1007 detects that a user's proposed database table design does include 3 or more single column indexes, then a context statement (reason) is obtained at 1009 to advise that while indexes help efficiency, more than three single column indexes on a table can slow down the table and that the user should ensure that these indexes are needed and/or see if some existing indexes can be combined. Consequently, a corresponding points amount "n" will be deducted from the current score. Otherwise, at 1007, if it is determined that the user's proposed database table design does not include more than three (3) single column indexes, then there is no issue and consequently no points deducted.

A further decision tree 1010 is shown in FIG. 9T which logic performs another column name evaluation by determining at 1012 whether the user's proposed database table design includes any columns that have the same name. If the decision tree logic 1012 detects that a user's proposed database table design does includes columns having the same name, then a further determination is made at 1014 as to whether there is a foreign key between each of these columns. If at 1014 it is determined that there is no foreign key between each of these columns, then a context statement (reason) is obtained at 1016 to indicate that column names with the same name should indicate a foreign key, and that if columns with the same name should not be foreign keys, advise to change at least one of the column names. Consequently, a corresponding points amount "n" will be deducted from the current score. Otherwise, at 1012, if it is determined that the user's proposed database table design does not have any columns that have the same name, or, at 1014, if it determined that there is a foreign key between each of these columns, then there is no issue and consequently no points deducted.

A further decision tree 1015 is shown in FIG. 9U which logic performs a database element name evaluation checking for reserved words by determining at 1017 whether the user's proposed database table design includes any user named database elements that use reserved words. If the decision tree logic 1017 detects that a user's proposed database table design does include user named database elements that use reserved words, then a context statement (reason) is obtained at 1019 to advise that no object in the database design should be a reserved word and that the use should alter the name of the database element that has a reserved word. Consequently, a corresponding points amount "n" will be deducted from the current score. Otherwise, at 1017, if it is determined that the user's proposed database table design does not include any user named database elements that user reserved words, then there is no issue and consequently no points deducted.

Figure 10:
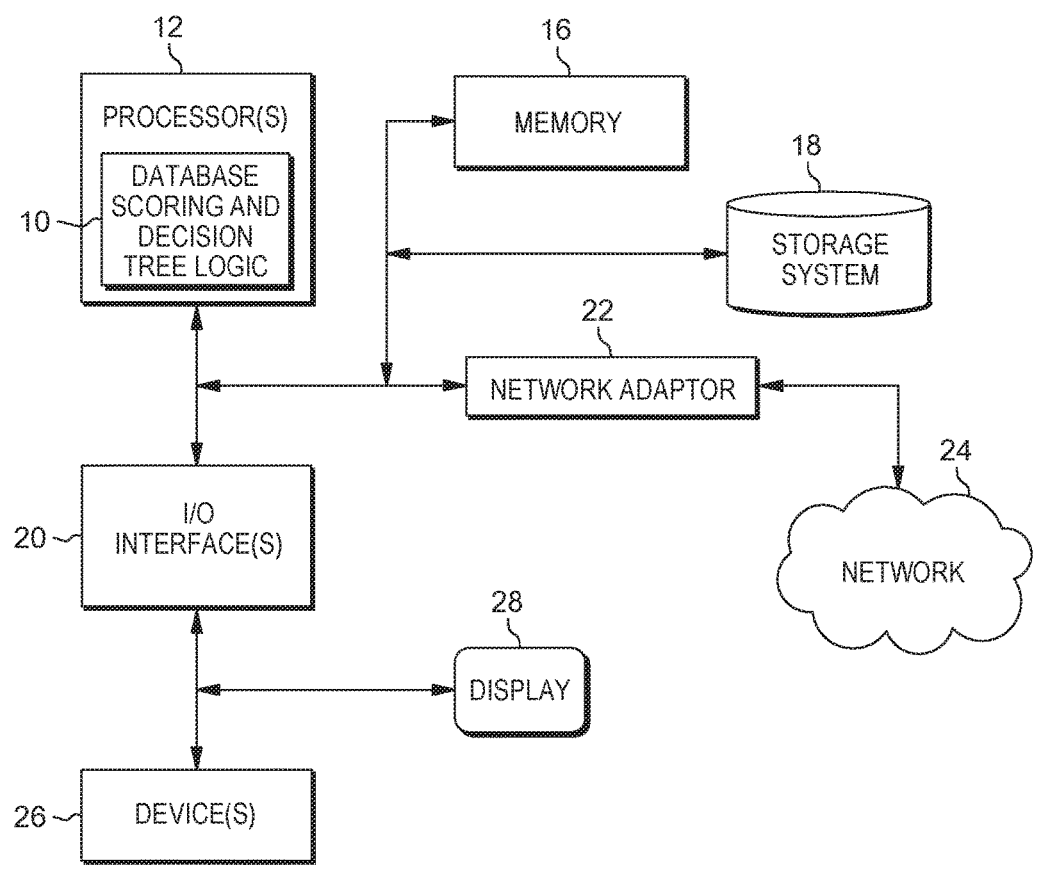
FIG. 10 illustrates a schematic of an example computer or processing system that may implement the method to retrieve a database score contextual information in one embodiment of the present disclosure.

FIG. 10 illustrates a schematic of an example computer or processing system that may implement the method to retrieve a database score contextual information in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the database scoring and method described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method implemented by at least one hardware processor for evaluating a database design comprising:
   receiving a design syntax or statements associated with one or more objects of a database;
   evaluating the design syntax or statements of each of the one or more objects of the database;

identifying, as a result of the evaluating, design issues associated with the evaluated design syntax or statements;
obtaining, a context information of any design issue identified, the context information indicating a reason for identifying the associated design issue;
determining, based on the obtained context information associated with each identified design issue, a respective point value associated with each identified design issue;
combining the respective point values associated with each identified design issue together to form a combined point value;
assigning a maximum point value as an initialized database score for the database;
reducing the initialized database score by the combined point value to determine a database score reflective of a quality of a design of the database;
generating a user interface including a feedback on the design of the database, the feedback including the database score and a listing of said received database design syntax or statements interlineated with the obtained context of each design issue identified; and
presenting the user interface on a display to a user, said user interface providing a guidance for a user to improve upon the design of the database.

2. The method of claim 1, wherein said evaluating comprises:
accessing a data storage repository comprising a decision tree logic structure; and
applying logic of said decision tree structure to each design syntax and statements of each of the one or more database objects to identify the design issues,
wherein said identified design issues are each mapped to a respective point value in said storage repository.

3. The method of claim 2, further comprising: using said respective mapped point values for reducing the initialized database score.

4. The method of claim 3, wherein said database objects comprise one or more database tables, a table having columns and keys defined by said syntax and statements, said method further comprising:
analyzing, at the computing system, the one or more said design syntax or statements specifying a table, table columns and keys; and
determining from said analyzing, a measure of the database design complexity; and modifying a database score according to said database design complexity measure.

5. The method of claim 2, further comprising:
normalizing, at a computing system, the received design syntax or statements according to a standard form recognizable by said applied decision tree logic.

6. The method of claim 3, wherein said feedback on the design of the database further comprises each identified design issue's respective mapped point value,
wherein the listing of said received database design syntax or statements is interlineated with the corresponding mapped point values for reducing said initialized database score.

7. A system for evaluating a database design comprising:
a memory storage device;
at least one hardware processor associated with said memory storage device, the at least one hardware processor configured to:
receive a design syntax or statements associated with one or more objects of a database;
evaluate the design syntax or statements of each of the one or more objects of the database;
identify, as a result of the evaluating, design issues associated with the evaluated design syntax or statements;
obtain a context information of any design issue identified, the context information indicating a reason for identifying the associated design issue;
determine, based on the obtained context information associated with each identified design issue, a respective point value associated with each identified design issue;
combine the respective point values associated with each identified design issue together to form a combined point value;
assign a maximum point value as an initialized database score for the database;
reduce the initialized database score by the combined point value to determine a database score reflective of a quality of a design of the database;
generate a user interface including a feedback on the design of the database, the feedback including the database score and a listing of said received database design syntax or statements interlineated with the obtained context of each design issue identified; and
presenting the user interface on a display to a user, said user interface providing a guidance for a user to improve upon the database design.

8. The system of claim 7, wherein to evaluate, said processing unit is further configured to:
access a data storage repository comprising a decision tree logic structure; and
apply logic of said decision tree structure to each design syntax and statements of each of the one or more database objects to identify an issue,
wherein said identified design issues are each mapped to a respective point value in said storage repository.

9. The system of claim 8, wherein said processing unit is further configured to: use said mapped point value for reducing the initialized database score.

10. The system of claim 9, wherein said database objects comprise one or more database tables, a table having columns and keys defined by said syntax and statements, said method further comprising:
analyzing, at the computing system, the one or more said design syntax or statements specifying a table, table columns and keys; and
determining from said analyzing, a measure of the database design complexity; and
modifying a database score according to said database design complexity measure.

11. The system of claim 9, wherein said feedback on the design of the database further comprises each identified design issue's respective mapped point value,
wherein the listing of said received database design syntax or statements is interlineated with the corresponding mapped point values for reducing said initialized database score.

12. The system of claim 8, further comprising:
normalizing, at a computing system, the received design syntax or statements according to a standard form recognizable by said applied decision tree logic.

13. A computer program product comprising:
a non-transitory computer readable media embodying a program of instructions executable by a hardware processing unit for evaluating a database design, the program of instructions, when executing, performing the following steps:
receiving a design syntax or statements associated with one or more objects of a database;
evaluating the design syntax or statements of each of the one or more objects of the database;
identifying, as a result of the evaluating, design issues associated with the evaluated design syntax or statements;
obtaining, a context information of any design issue identified, the context information indicating a reason for identifying the associated design issue;
determining, based on the obtained context information associated with each identified design issue, a respective point value associated with each identified design issue;
combining the respective point values associated with each identified design issue together to form a combined point value;
assigning a maximum point value as an initialized database score for the database;
reducing the initialized database score by the combined point value to determine a database score reflective of a quality of a design of the database;
generating a user interface including a feedback on the design of the database, the feedback including the database score and a listing of said received database design syntax or statements interlineated with the obtained context of each design issue identified; and
presenting the user interface on a display to a user, said feedback providing a guidance for a user to improve upon the design of the database.

14. The computer program product of claim 13, wherein said evaluating comprises:
accessing a data storage repository comprising a decision tree logic structure; and
applying logic of said decision tree structure to each design syntax and statements of each of the one or more database objects to identify the design issues, wherein said identified design issues are each mapped to a respective point value in said storage repository; and
using said respective mapped point values for reducing the initialized database score.

15. The computer program product of claim 14, wherein said feedback on the design of the database further comprises each identified design issue's corresponding mapped point value,
wherein the listing of said received database design syntax or statements is interlineated with the corresponding mapped point values for reducing said initialized database score.

16. The computer program product of claim 14, wherein said database objects comprise one or more database tables, a table having columns and keys defined by said syntax and statements, said method further comprising:
analyzing, at the computing system, the one or more said design syntax or statements specifying a table, table columns and keys; and
determining from said analyzing, a measure of the database design complexity; and modifying a database score according to said database design complexity measure.

17. The computer program product of claim 14, the method further comprising:
normalizing, at a computing system, the received design syntax or statements according to a standard form recognizable by said applied decision tree logic.

* * * * *